(12) United States Patent
Capriotti

(10) Patent No.: US 9,058,449 B2
(45) Date of Patent: Jun. 16, 2015

(54) SIMULATING MACHINE AND METHOD FOR DETERMINING SENSITIVITY OF A SYSTEM OUTPUT TO CHANGES IN UNDERLYING SYSTEM PARAMETERS

(75) Inventor: Luca Capriotti, New York, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 1498 days.

(21) Appl. No.: 12/602,452

(22) PCT Filed: May 30, 2008

(86) PCT No.: PCT/US2008/065445
§ 371 (c)(1),
(2), (4) Date: Aug. 23, 2010

(87) PCT Pub. No.: WO2008/151098
PCT Pub. Date: Dec. 11, 2008

(65) Prior Publication Data
US 2010/0312530 A1 Dec. 9, 2010

Related U.S. Application Data

(60) Provisional application No. 60/940,961, filed on May 30, 2007.

(51) Int. Cl.
*G06G 7/48* (2006.01)
*G06F 13/10* (2006.01)
*G06F 17/50* (2006.01)

(52) U.S. Cl.
CPC .......... *G06F 17/504* (2013.01); *G06F 17/5018* (2013.01); *G06F 2217/10* (2013.01); *G06F 2217/86* (2013.01)

(58) Field of Classification Search
CPC .............. G06F 17/504; G06F 17/5008; G06F 2217/10; G06F 2017/86
USPC ........................................................ 703/23, 6
See application file for complete search history.

(56) References Cited

U.S. PATENT DOCUMENTS

| 6,061,662 A * | 5/2000 | Makivic ....................... 705/36 R |
| 2002/0016704 A1 * | 2/2002 | Blanks ............................ 703/14 |
| 2004/0181365 A1 | 9/2004 | Liu et al. |
| 2005/0004833 A1 * | 1/2005 | McRae et al. ................... 705/11 |
| 2006/0059446 A1 | 3/2006 | Chen et al. |
| 2006/0200333 A1 | 9/2006 | Dalal et al. |

* cited by examiner

*Primary Examiner* — Kamini S Shah
*Assistant Examiner* — Andre Pierre Louis
(74) *Attorney, Agent, or Firm* — Kenneth L. Johnson; Chadbourne & Parke LLP

(57) ABSTRACT

The invention provides improved apparatus, systems and methods for simulating systems, processes and environments characterized by stochastic processes. The invention is particularly useful when Monte Carlo or Quasi Monte Carlo simulation techniques are employed in a simulation. The invention provides indications of sensitivities of simulated process outputs to changes in underlying process parameters. Embodiments of a simulator of the invention operate at a speed suitable for use in real time environments. In addition, the computational cost of a simulator of the invention relative to the cost associated with the output process is independent of the number of sensitivities and of the number of observations involved in the simulation.

6 Claims, 9 Drawing Sheets

SIMULATING MACHINE AND METHOD FOR DETERMINING SENSITIVITY OF A SYSTEM OUTPUT TO CHANGES IN UNDERLYING SYSTEM PARAMETERS

FIELD OF THE INVENTION

The present invention relates generally to simulation machines and simulation methods and more particularly to simulator machines and methods for simulating stochastic systems while providing an indication of sensitivity of predicted stochastic system output values to changes in simulator input parameters influencing the system output.

BACKGROUND OF THE INVENTION

Simulation machines are used to model many natural and human systems in physics, chemistry, biology and engineering as well as in economics, finance and social science. A simulation is an imitation of a system, or process. The act of simulating something generally entails representing certain key characteristics or parameters of a selected physical or mathematical system. Simulators aid in exploring possibilities and outcomes, diagnosing problems and transferring simulated actions to the real systems.

The output of a physical system or process can be sensitive to changes in parameter values of underlying systems and processes. When these sensitivities are understood, a simulator provides a tool for making choices about physical or mathematical systems or process. Simulators can provide valuable information about how variation in the output of a simulated system or process can be allocated, qualitatively or quantitatively, to different sources of variation in the input of the simulated process.

For example, simulators are used in communications, medical, aeronautical, meteorological, financial and other industries to characterize and model systems and processes in terms of their subsystems and sub-processes. A sensitivity analyzer identifies the inputs to the subsystems and sub-processes that contribute most to the random variability in the output. Once these inputs are identified they can be controlled or compensated in a practical situation.

Monte Carlo (MC) and Quasi Monte Carlo (QMC) are families of simulation techniques widely used in various branches of science and engineering. MC simulation techniques are based on stochastic sampling. Thus MC simulations are uniquely suited for simulating systems and processes characterized by many computational dimensions. However, MC simulators have drawbacks. The most significant of these is the abundant computational resources demanded by MC simulators.

For this reason, to be used in a real-time simulation MC simulators typically require large parallel computers for their implementation. They incur a high financial cost in terms of hardware, infrastructure, and software development.

These efficiency issues become especially pronounced when MC simulations are used to calculate the sensitivities of the system or process output to variations in the parameters of the underlying model. In fact, each sensitivity is typically calculated by perturbing the corresponding parameter and repeating the simulation. This method is also know as 'bumping'. As a result, the simulation time of typical MC simulators for the calculation of sensitivities increases in proportion to the number of parameters of a simulation model. Thus the time required for a MC simulator to complete a simulation of a complex scenario is frequently unacceptable for use in real time environments.

More efficient techniques than standard bumping have been proposed. For example, a more efficient variation of the so called pathwise derivative method has been recently proposed by Mike Giles and Paul Glasserman of resp. Oxford and Columbia University for a particular type of function output and simulated model. While some efficiency is achieved with these techniques, they rely on differentiation of the mathematical functions that represent the simulation output at future time. These derivatives are generally time consuming and expensive to evaluate.

Another drawback of foregoing proposed solutions is that computational cost is proportional to the number of future times accounted for in a simulation. This number can be large, for instance for processes depending on daily observation of an underlying process on a time horizon of several months. As a result the aforementioned drawbacks of MC simulators have yet to be overcome.

Faster and more efficient apparatus, systems and methods for calculating sensitivity using Monte Carlo and Quasi Monte Carlo simulators are needed. Further needed are apparatus, systems and methods for calculating sensitivity at a cost that is independent of the number of sensitivities calculated, and independent of the number of observations upon which a process or system depends.

SUMMARY OF THE INVENTION

The invention provides improved apparatus, systems and methods for providing sensitivities of a system output with respect to system parameters. A method according to an embodiment of the invention is carried out by generating sample values for components of the system. The sample values are operated on in accordance with an adjoint output function and an adjoint sample unit to provide a sensitivity indicator for the output.

DESCRIPTION OF THE DRAWING FIGURES

These and other objects, features and advantages of the invention will be apparent from a consideration of the following detailed description of the invention considered in conjunction with the drawing Figures, in which.

DETAILED DESCRIPTION OF THE INVENTION

FIG. 1 Prior Art

Figure 1:
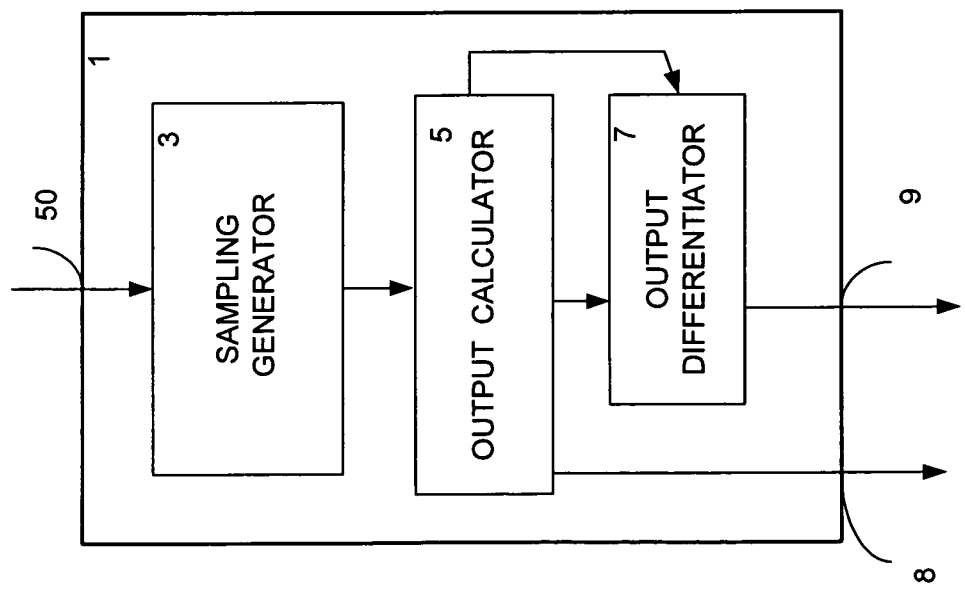
FIG. 1 is a block diagram of a prior art simulator.

FIG. 1 is a block diagram of a prior art simulator 1. Simulator 1 comprises a sample generator 3. Sample generator 3 is configured to provide random samples comprising a set of state vectors X. Sample generator 3 typically generates samples according to a probability distribution Q(X), to produce a number $N_{scenarios}$ of possible realizations of a state vector X, as represented by:

$$(X[1], \ldots, X[N_{scenarios}]).$$

In many cases where large numbers of dimensions need to be simulated, simulator 1 employs Monte Carlo (MC) techniques to generate the samples. For each scenario generated by sample generator 1 an output function calculator 5 evaluates the output function according to the sampled value of the state vector. Accordingly an output estimate V is provided at output 8.

A differentiator 7 calculates finite difference approximations of the sensitivities. This method, also known as 'bumping', involves repeating the MC simulation multiple times for slightly perturbed values of the input parameter $\theta_i$ i=1, ..., n. In that manner conventional simulator 1 calculates sensitivities as approximations of the derivatives $\partial V/\partial \theta_i$. However this method has drawbacks.

The main drawback of system 1 and the conventional method described above is that additional MC simulations are required for each parameter for which output sensitivity will be determined. Thus, the total simulation time is proportional to the number of parameters for which output sensitivity will be calculated. Hence simulators that are called upon to evaluate a large number of parameters are too slow to be useful in practical situations.

Therefore simulator machines, systems and methods for determining sensitivity of a system or process outcome to changes in underlying parameters that do not increase simulation time when the number of parameters is increased are needed.

Figure 2:
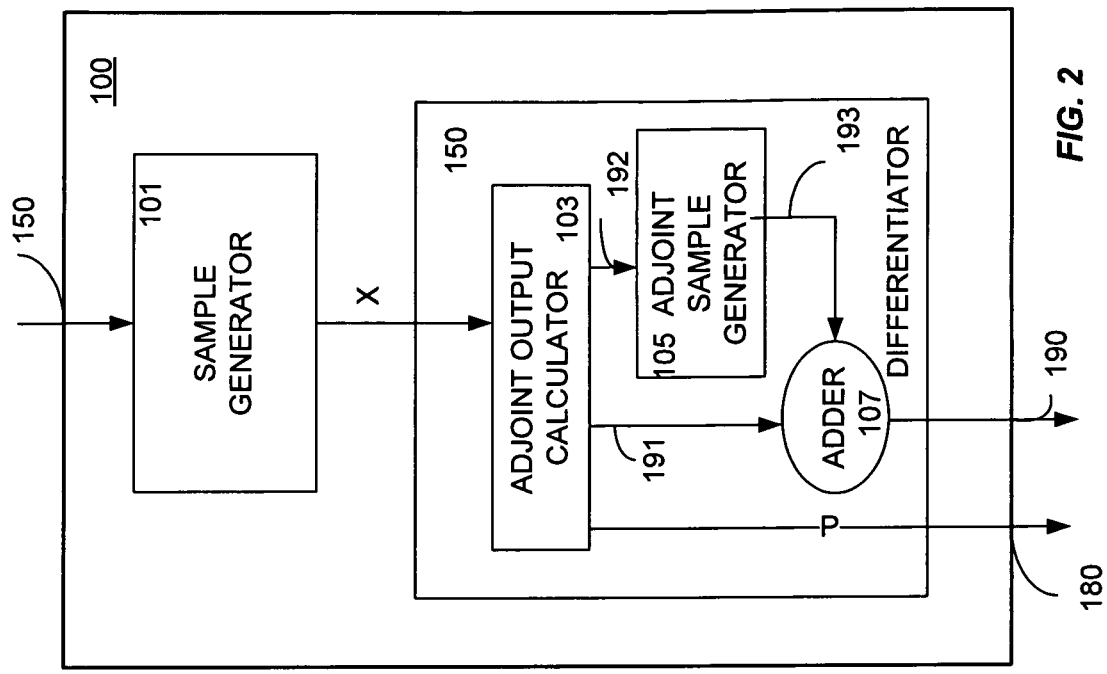
FIG. 2 is a block diagram of a simulator according to an embodiment of the invention.

FIG. 2 Simulator System 100

Figure 3:
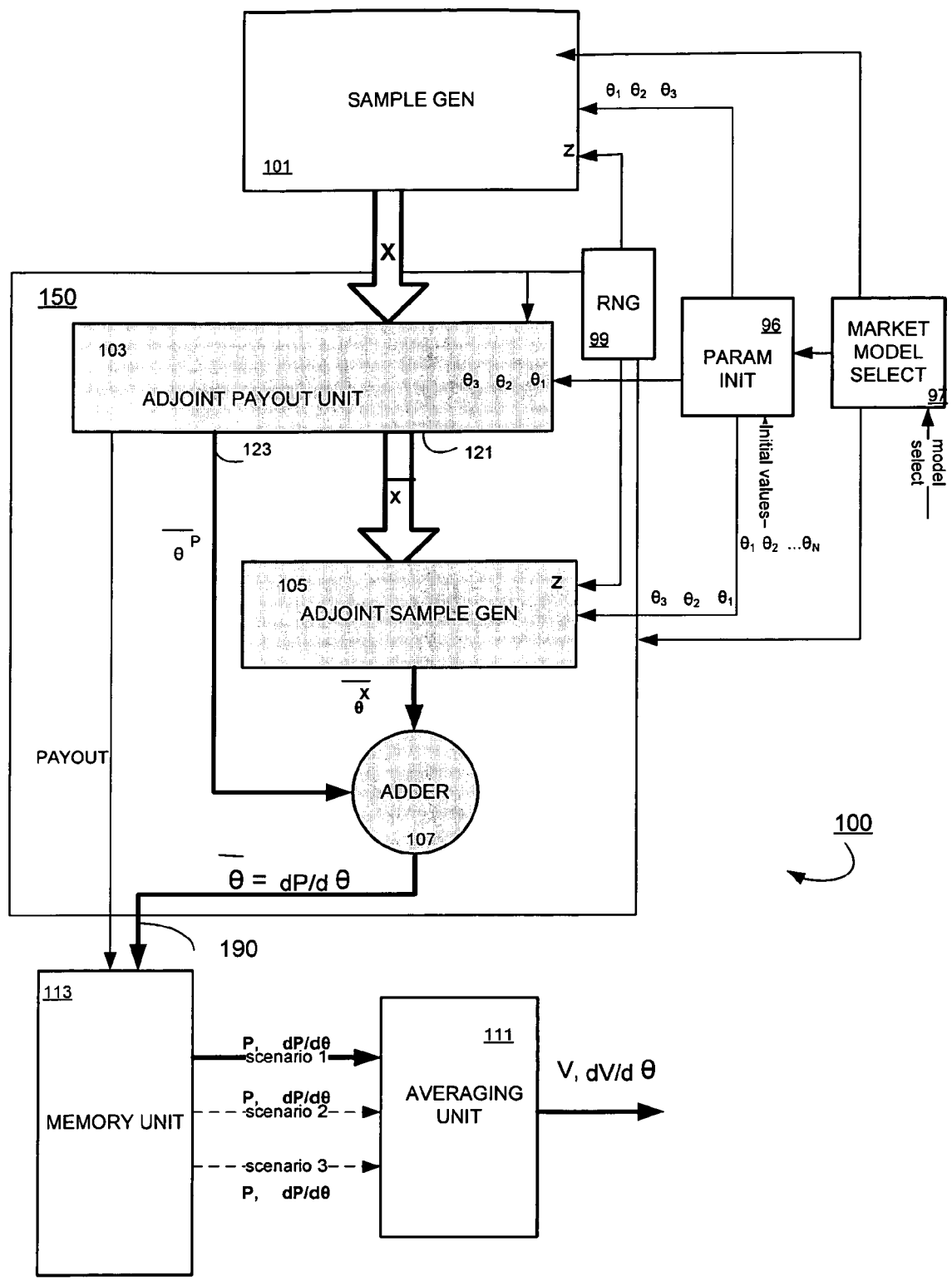
FIG. 3 is a block diagram illustrating further details of a simulator according to an embodiment of the invention.

FIG. 2 is a simplified block diagram of a simulator 100 according to an embodiment of the invention. Simulator 100 is suitable for use in a variety of industries in many situations in which a process or system output is determined by a relationship between parameters characterizing underlying system components. The simulator embodiment illustrated in FIGS. 2 and 3 are particularly suited to applications wherein stochastic underlying factors influence component values and where a system under simulation provides an output P defined by a relationship of the component values.

Simulator 100 determines sensitivity of a system output P to changes input parameters. Significantly, increasing the number of component-characterizing parameters in the simulation of a system output P will not add to the simulation time beyond four times the cost of calculating the output P alone. This feature of system 100 stands in contrast to conventional systems where increasing the number of parameters accounted for in a simulation can degrade simulator performance to levels that are unacceptable for many practical simulator applications. For instance, a conventional system depending on 60 parameters and providing its output P in 1 minute typically provides the parameter sensitivities in about 1 hour. In contrast, system 100 is able to provide the same output in less than 4 minutes.

Simulator system 100 generally comprises a sample generator 101 coupled to a differentiator 150. Sample generator 101 generates sampled values X of components of a system under simulation. The sample values X are provided to a differentiator 150.

Differentiator 150 comprises an adjoint output unit 103, an adjoint sample generator 105 and an adder 107. Adjoint output unit 103 of differentiator 150 receives sample values X from sample generator 101. Adjoint output unit 103 provides three output values based on the X values it receives. Adjoint output unit 103 provides a system output P calculated based on a relationship of system components defined by a system model. Output P is provided at a first output 180 of adjoint output unit 103.

Adjoint output unit 103 provides an indication $\bar{\theta}^P$ of explicit sensitivity of output P with respect to $\theta$ at a second output 191. Output 191 is coupled to a first input of an adder 107. Adjoint output unit 103 provides vector $\bar{X}$ at a third output 192. Vector $\bar{X}$ represents sensitivity of output P with respect to X.

An adjoint sample unit 105 receives vector $\bar{X}$ from third output 192. Adjoint sample unit 105 provides an indication $\bar{\theta}^X$ of implicit sensitivity of output value P to changes in $\theta$. Adder 107 combines first and second adder inputs to provide $\bar{\theta}$ at an adder output 190. $\bar{\theta}$ represents the sensitivity of the output P of a simulated system to parameters influencing component values comprising the simulated system.

In a financial industry embodiment of the invention simulator 100 is generally configured to determine an option price by relating an expectation value $V(\theta)$ of an option at its expiry to a payout function $P(X,\theta)$. In some embodiments of the invention the option price is discounted at the present date. In some embodiments of the invention the option price is determined using an appropriate probability measure Q(X). For example:

$$V(\theta) = E_Q[P(X,\theta)]$$

wherein X represents a vector of d random state variables $X=(X_1, \ldots, X_d)$ upon which the option payout depends and Q(X) is a multi-dimensional probability distribution of the random state variables.

In a finance industry application the vector X represents the value of a collection of market factors (e.g., stock prices, interest rates, etc.) on a set of dates specified by the contract under valuation. In the first case for instance, d is typically the number of underlying factors times the number of dates on which the underlying factors are observed.

It will be understood by those of ordinary skill in the art that blocks of simulator 100 of the embodiments of the invention illustrated in the various embodiments illustrated herein represent functions implemented by hardware and software components of the various physical embodiments. Various embodiments of the invention implement functions in hardware, software or combinations thereof.

Further, hardware and software components implementing a particular function need not be implemented in a single physical unit to perform the described function. Instead hardware and software components are embeddable in simulators of the invention in a variety of configurations and across a variety of physical units. For example processor and memory units are configurable to process and store information related to more than one functional unit.

While functional units may be described and illustrated herein with reference to an associated separate processor or memory unit, an actual implementation may consolidate functional tasks by assignment to a single unit, or to more or fewer processor or memory units than are illustrated in the examples herein.

Conversely, a single processor memory may be illustrated wherein an actual implementation distributes the memory contents across a plurality of physical memory units. Therefore the functional blocks illustrated below represent hardware, software and combinations of components configured to cooperate to implement the described function, regardless of physical location of the components in a particular physical embodiment. Any arrangement of hardware and software components cooperating in accordance with the descriptions and drawings provided herein is suitable for implementing the embodiments of the invention described herein.

Figure 4:
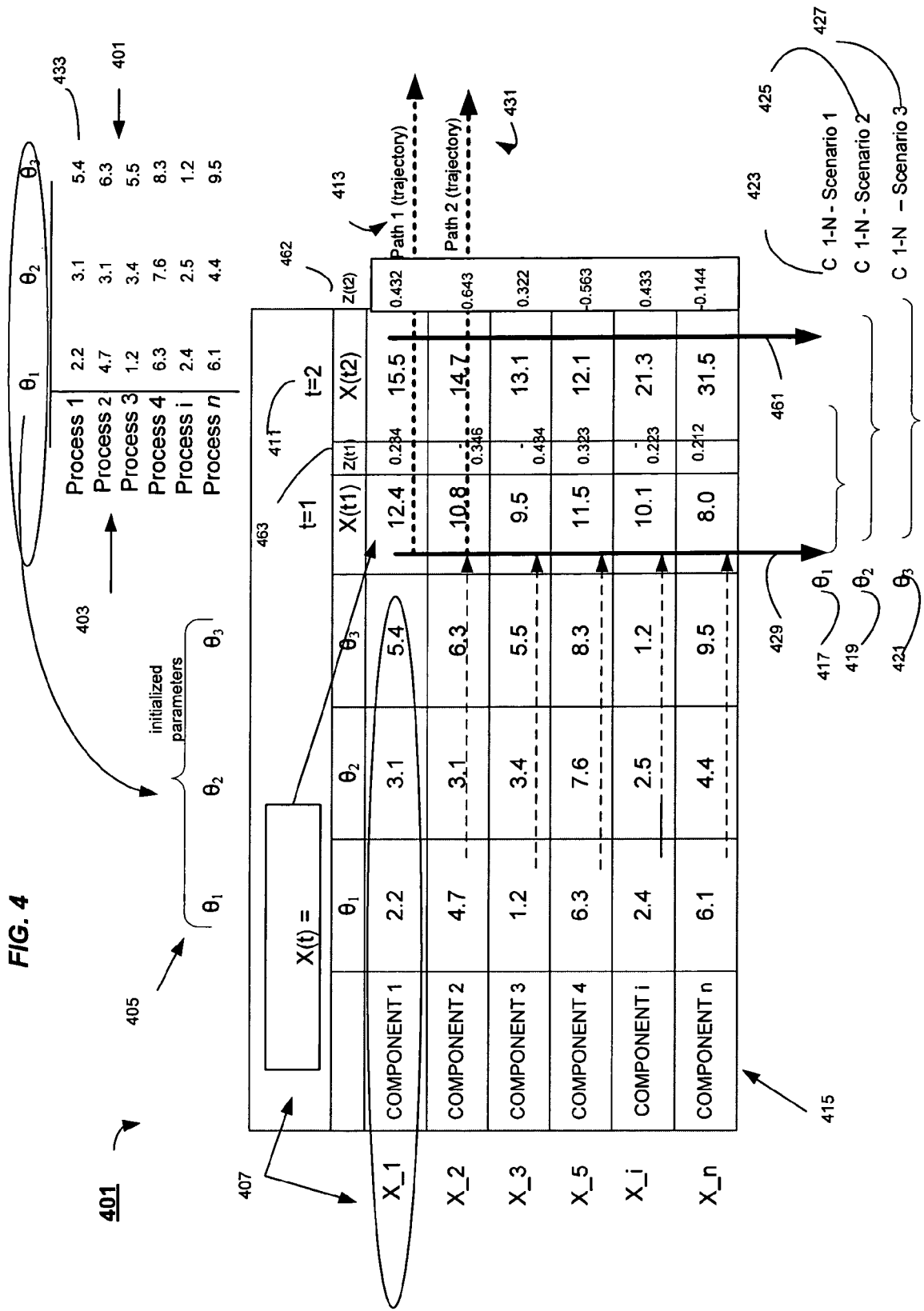
FIG. 4 is a conceptual diagram of a sample generator useful for describing the various embodiments of the invention.

FIG. 4 Terms, Definitions and Symbols

FIG. 4 provides simplified example sample generation useful for describing the various embodiments of the invention. The example illustrated in FIG. 4 as discussed herein will provide terms definitions and symbols used throughout the remainder of this specification with respect to the various embodiments of the invention.

As illustrated in FIG. 4 a sample generator 101 is configured to generate samples for a simulation. A system under simulation comprises components 1-$n$. A system output V is determined by values assigned to components 1-$n$. Output V is related to component values in accordance with an output function P. In a financial industry embodiment of the invention the output function is a payout function.

Values assigned to components 1-$n$ are determined, in part, in accordance with an interrelationship of components 1-$n$. The interrelationship is given by a selected system model. The component values are determined, in part, by random factors. Thus the behavior of the simulated system is modeled as a stochastic process.

Behavior, or state of each component is characterized by a set of parameters e.g., ($\theta_1$, $\theta_2$, $\theta_3$) in accordance with a model M. For example, a parameter $\zeta$ might represent an edge shape in a wing configuration component of an aircraft according to an airflow model. In another example a parameter $\theta$ represents a value on the volatility surface in a component comprising a stock according to a financial market model. Regardless of application, model M relates a set of parameters to a component value X(t).

For purposes of illustration each component illustrated in FIG. 4 is characterized by the same model, i.e., comprising an identical set of component parameters ($\theta_1$, $\theta_2$, $\theta_3$). However, it will be recognized by those of ordinary skill in the art upon reading this specification that various components may be characterized by different models. Thus differing sets of parameters may characterize these various components. The set of all possible parameters $\theta$ comprising a model characterizing all components of a system under simulation is designated herein as ($\theta_1$, $\theta_2$, ..., $\theta_n$).

In the specific example illustrated in FIG. 4 model M relates component values X(t) to three parameters ($\theta_1$, $\theta_2$, $\theta_3$) as follows:

$$X(t_i) = X(t_{i-1})\exp\left[\left(\theta_1 - \frac{\theta_2^2}{2}\right)t + \theta_2\sqrt{t} * Z_i\right]$$

where $\theta_3 = X(t_0)$ and $Z_i$ are standard normal random variables.

Sample generator 401 is initialized by assigning initial values of ($\theta_1$, $\theta_2$, $\theta_3$) to each components 1-$n$ as indicated at 403. In one embodiment of the invention initialized values are provided by a simulator operator prior to commencing a simulation. For example, component 1 is assigned parameters values of $\theta_1$=2.2; $\theta_2$=3.1, and $\theta_3$=5.4.

Upon commencement of the simulation values X(t) are computed for each component at a first time $t_1$=1. The values are computed using the parameter values illustrated at 403. A vector of values comprising a scenario for time $t_1$=1 is indicated at 429. For output functions defined by two time observations of each component, a scenario is generated based on a second time $t_2$=2. The vector of values comprising the scenario at time $t_2$=2 is indicated at 461. Therefore vectors indicated at 429 and 461 comprise a state vector for each scenario.

Each scenario is evaluated with respect to the same parameters ($\theta_1$, $\theta_2$, $\theta_3$) as indicated at 417, 419 and 421. Therefore each parameter evaluation yields a state vector representing a scenario.

In contrast to state vector values, values along lines 413 and 431 are generated over time with respect to each component of the system under simulation. These time values comprise a path. A path is a trajectory of values for a component in time.

Embodiments of the invention represent uncertain characteristics of system components by adjusting both state vectors and path values by randomly generated numbers. As indicated at 462 and 463 a random number Z is generated for each component of each scenario at each sample time.

FIG. 3 Detailed Block Diagram

General Operation

FIG. 3 is a detailed block diagram of the simulator 100 of FIG. 2 according to an embodiment of the invention. As illustrated in FIG. 3 a simulator 100 comprises a sample generator 101 configured to receive simulator settings from a model selector 97 and a parameter selector 96. A random number generator 99 provides random numbers to sample generator 101 and to adjoint sample generator 105. An adjoint payout unit 103 implements an adjoint payout function and is configured based on a contract payout function.

Adjoint payout unit 103 receives samples X from sample generator 101. Adjoint payout unit 103 provides the value of the payout, P, at first output. This value is provided to a memory unit 113. A second output $\overline{X}$ of adjoint payout unit 103 is provided to an adjoint sample generator 105. A third output, $\overline{\theta}^P$, is provided to adder 107. Adjoint payout unit 103 provides first, second, and third outputs based on samples X received from sample generator 101.

Adjoint sample generator 105, receives an adjoint state vector, $\overline{X}$, from the adjoint payout unit 103 and provides the output $\overline{\theta}^X$ to adder 107. Adder 107 adds values received at its first and second inputs. The sum is provided at an output of Adder 107 to memory unit 113. An averaging unit 111 averages the quantities stored in memory unit 113 over the scenarios generated. In one embodiment of the invention these averages represent the value of an option, and its sensitivities with respect to the model parameters.

Market Model Selector Unit 97

In one embodiment of the invention a model selector 97 receives an input indicating a user selected model. In response to receiving the indication of a model selection, model selector 97 provides an initialization signal for a subset $\theta$=($\theta_1$, $\theta_2$, ..., $\theta_n$) of the possible parameters $\theta$=($\theta_1$, $\theta_2$, ..., $\theta_N$), selectable for use in Simulator 100. Such subset describes a market in terms of the selected model. For purposes of this discussion three parameters ($\theta_1$, $\theta_2$, $\theta_3$) comprise an example of such subset wherein n=3.

According to one embodiment of the invention selectable models include a multi-dimensional (Black-Scholes) lognormal, local volatility, stochastic volatility, Jump diffusion, structural, correlated defaults, Libor market, Markov functional and other models.

As seen in FIG. 3, the quantities $\theta=(\theta_1, \theta_2, \ldots, \theta_N)$ are provided at an input of market model selector unit 97. These quantities represent the set of all possible parameters of financial market models selectable for use in simulator 100. The specific model used in the simulation is operator selectable via a model selector 97. For a specific model selected via model selector 97, a parameter subset $\theta=(\theta_1, \theta_2, \ldots, \theta_n)$, e.g., parameters $(\theta_1, \theta_2, \theta_3)$ is selected and initialized by parameter initializer 96. The selected parameter subset is then used in a simulation.

As those of ordinary skill in the art will readily appreciate upon reading the description provided herein, the invention is not limited to implementations based upon any particular model. Instead a variety of financial, physical, and other models are suitable for use in various embodiments of the invention.

According to one embodiment of the invention outputs of market model selector unit 97 are provided to a sample generator 101 and to an adjoint sample generator 105. These outputs are used to configure sample generator 101 and adjoint sample generator 105 in accordance with the selected model.

Parameter Initializes Unit 96

Once a market model is selected, market model selector unit 97 provides an initialization signal to parameter initialization unit 96. In response to receiving the initialization signal, parameter initialization unit 96 initializes the set of parameters $\theta=(\theta_1, \theta_2, \ldots, \theta_n)$ on which the selected model depends. In the example illustrated in FIG. 1 an example selected model depends on three parameters $(\theta_1, \theta_2, \theta_3)$. Parameter initialization unit 96 provides initial values $(\theta_1, \theta_2, \theta_3)$ to sample generator 101, to adjoint sample generator 105, and adjoint payout unit.

Sample Generator 101

Sample generator 101 is configured to generate a sample of representative scenarios based on the selected model and the initial values assigned to parameters $(\theta_1, \theta_2, \theta_3)$. Sample generator 101 generates samples of a state vector X to simulate a physical or financial system, or a process. $X=(X_1, \ldots, X_d)$ is a vector of d random state variables upon which the system or process output depends.

Here and in the following, we generally indicate explicitly only the dependencies of the various functions on the variables depending on the model parameters $\theta$. For instance, according to embodiments of the invention, sample generator 101 depends on a variety of variables whose value is unaffected by a perturbation of the model parameters $\theta$. In particular, it generally depends on a set of random variables used to perform the sampling Q(X) (e.g., a set of uniform random or Gaussian random numbers).

In some embodiments of the invention, the sample generator 101 generates d-dimensional vectors of state variables $X=(X_1, \ldots, X_d)$ by implementing a series of relations that define the dependence of each sample of X on the values of the parameters $\theta$ and on random numbers Z provided by a random number generator 99. Each vector X generated by a set of random numbers Z defines a scenario X=X[iscenario]. Conversely, for a given scenario, the output of sample generator 101 is a random state vector $X=(X_1, \ldots, X_d)$.

For example, according to one embodiment of the invention the vector X represents values of a plurality of components comprising a circuit or a system whose output is under evaluation. In another embodiment of the invention the vector X represents a collection of market factors (e.g., stock prices, interest rates, etc.) on a set of dates specified by a contract under valuation.

To generate each scenario sample generator 101 maps a value set assigned to parameters $\theta$ and a model dependent number of (pseudo or quasi) random numbers to a random sample value X(t) for each possible payout time specified in a contract under evaluation. For example if a contract depends on the observation of underlying assets at time $(T_1, \ldots, T_m)$, the vector X will be of the form $(X(T_1), \ldots, X(T_M))$ where $X(T_j)$ is the simulated value of the underlying factors at time $T_j$. Here X(t) represents a realization of the value of all the underlying factors on which the payout is contingent at time T.

The components of each vector may be evolved as paths or discretized trajectories in time. In other cases, they can be sampled directly according to the probability distribution, Q(X) underlying the selected model.

For instance in one embodiment of the invention the state vector X is generated in accordance with random numbers generated by random number generator 99 to implement a Monte Carlo simulation based on a Copula distribution. For simplicity, examples presented herein are based on Gaussian Copulas. A Gaussian Copula is defined by a correlation matrix $\Sigma$ and a set of d marginal cumulative distributions $M_i(x_i, \theta)$ so that the joint cumulative distribution is described as follows $$F(x) = \prod_{i=1}^{d} \int_{-\infty}^{x} dy_i P(y_1, \ldots, y_d)$$

$$= \Phi_d(\Phi^{-1}(M_1(x_1, \theta)), \ldots, \Phi^{-1}(M_d(x_d, \theta)); \Sigma)$$

Wherein $\Phi_d(Y_1, \ldots, Y_d; \Sigma)$ is the cumulative distribution of a d-dimensional Gaussian random variable with zero mean and correlation matrix $\Sigma$. In this case $\Phi(.)$ represents the standard normal cumulative density function (CDF).

In one embodiment of the invention the distribution of random variables assigned to X is implemented by calculation of the following d correlated random variables $$H_i = \Phi(Y_i),$$

with $i=1, \ldots, d$. Here $Y=(Y_1, \ldots, Y_d)$, is a is a d-dimensional sample of $\Phi_d(Y_1, \ldots, Y_d; \Sigma)$. The random variables $H=(H_1, \ldots, H_d)$ are mapped to the variables $X=(X_1, \ldots, X_d)$ as $$X_i = M_1^{-1}(H_i, \theta),$$

with $i=1, \ldots, d$. These are implemented by a set of functions of the form $$X_i = \text{INVERSECDF}\_i(\theta)$$

wherein the vector X is provided as the output of sample generator 101. Note that in this embodiment the random numbers Z generated by random number generator 99 are used to generate the d-dimensional sample of $\Phi_d(Y_1, \ldots, Y_d; \Sigma)$ according to standard methods. Dependence on Z of the various methods is omitted for simplicity of exposition.

In another embodiment of the invention, sample generator 101 is configured to implement a Markov Chain process. In this embodiment, sample generator 101 propagates the random vector X for a certain number of steps, according to algorithmic rules depending on the parameters $\theta$, and, parametrically, on the random vector Z provided by the random number generator 99. These rules are specific to the selected model, and on the n-th step, for a given set of random numbers Z, take the form of the deterministic relation $$X(n+1) = F_n(X(n), \theta)$$

where $F_n(X(n), \theta)$ is a transformation from $R^{n+d}$ to $R^d$.

In some embodiments of the invention, sample generator 101 implements a Monte Carlo simulation of a multi dimensional diffusion of the form $$dX(t)=a(X,\theta,t)dt+b(X,\theta,t)dW_t$$

wherein X(t) is p-dimensional vector representing the value of a set of p underlying factors at time t, $W_t$ is a 1-dimensional Brownian motion, $a(X,\theta,t)$ is a real function taking values in $R^p$ and $b(X,\theta,t)$ is a $R^{p\times l}$ matrix of real functions. In one example, X records a vector of underlying assets like equity, foreign-exchange (FX), commodities or interest rates. In these embodiments the simulation of the Brownian increments is generally implemented by means of the random numbers Z provided by the random number generator 99.

In some embodiments of the invention, the evolution of the underlying state vector X is approximated using a suitable discretization of the trajectories in time, e.g., the Euler discretization. For instance, in the case in which the state vector X follows a multidimensional diffusion, its evolution over a time horizon T can be approximated by means of the following relation $$X(n+1)=X(n)+a(X(n),\theta,n)h+b(X(n),\theta,n)\sqrt{h}Z_n$$

Here X (n) represents the simulated vector of the underlying assets at time t=n h where h=T/N is the length of the time step, and the integer N is the number of times steps in which the time horizon T is divided. The vector $Z_n$ is a vector of l independent Gaussian random variables provided by random number generator 99.

In other examples the sample generator 101 implements other stochastic models providing algorithmic rules for the sampling of the state vector X including, stochastic volatility, Jump-diffusion, Hull-White, Heath-Jarrow-Merton and Libor Market models to name but a few.

Regardless of a selected model, sample generator 101 provides at an output a random realization of a state vector X for each scenario. Several commercially available software packages exist for implementing sample generator 101. For example, Lumenaut Ltd, 7th Floor Po Hing Court, 10-18 Po Hing Fong, Sheung Wan, Hong Kong and GoldSim Technology Group LLC, 300 NE Gilman Blvd, Suite 100 Issaquah, Wash. 98027-2941 USA are two of the many companies that provide Monte Carlo sample generating tools suitable for use in various embodiments of the invention. Other suitable Monte Carlo based software packages implementing sample generators suitable for use in embodiments of the invention will be known to those of ordinary skill in the art.

Adjoint Payout Unit 103

Adjoint Algorithmic Differentiation

Adjoint payout unit 103 is configured by adjoint algorithmic differentiation (AAD) techniques. Before discussing adjoint payout unit 103 an overview of algorithmic differentiation is provided below.

Algorithmic Differentiation (AD)

Algorithmic Differentiation (AD) is a technique first introduced in 1960 aimed at computing accurately and efficiently the derivatives of a function given the input form of a computer program. Computer code comprises functions. Each function in turn comprises a composition of basic arithmetic (addition, multiplication, etc.), and intrinsic operations (logarithm, trigonometric functions, etc.). Derivatives of the program outputs with respect to its inputs are calculated by applying the rules of differentiation—and in particular the chain rule—to functions comprising a computer program.

When compared to standard (finite difference) methods for the calculation of derivatives AD is computationally more efficient than standard methods. AD exploits the information in computer coded representations of calculations and the dependencies between computer implemented steps for carrying out a calculation. In particular, in some cases, the calculation of the derivatives is highly optimizable by applying the chain rule through the instructions of the program in an appropriate fashion. This gives rise to the Adjoint Algorithmic Differentiation (AAD) technique which is employed in implementations of the invention.

Adjoint Algorithmic Differentiation (AAD)

One embodiment of the invention operating in an adjoint mode of AD, or adjoint algorithmic differentiation (AAD), calculates a function F and its Jacobian with a cost—relative the one for F—which is bounded by a small constant, $\omega$, times the number of dependent variables, namely:

$$\frac{\text{Cost }[F \text{ \& Full Jacobian}]}{\text{Cost }[F]} \le \omega m$$

with $\omega \approx 4$ and m is the number of dependent variables.

As a result, AAD provides the full gradient of a scalar (i.e., m=1) function at a cost which is just a small constant times the cost of evaluating the function itself. Surprisingly, such cost is independent of the number of components of the gradient (i.e., the number of sensitivities calculated). In contrast, the relative cost of evaluating the same gradient by conventional systems and methods relying on finite differences, increases linearly with the number of sensitivities.

For vector valued functions, AAD provides the gradient of arbitrary linear combinations of rows of the Jacobian at the same computational cost of a single row, namely $$\frac{\text{Cost }[F \text{ \& Lin. Comb. Rows of Jacobian}]}{\text{Cost }[F]} \le \omega.$$

This advantage is one basis for design of the present system for the calculation of payout sensitivities.

Given a stored code for a computer implemented function F of the form $$Y=\text{FUNCTION}(X)$$

with X and Y vectors in $R^n$ and $R^m$, respectively, a differentiator according to embodiments of the invention calculates a linear combination of the rows of its Jacobian automatically by directly accessing the stored model. AAD tools are commercially available that, given a stored model of the form Y=FUNCTION(X) generate the so-called adjoint function $$\overline{X}=\text{FUNCTION\_BAR}(X,\overline{Y}),$$

with $\overline{X}$ and $\overline{Y}$ vectors in $R^n$ and $R^m$, respectively, and such that $$\overline{X}_i = \sum_{j=1}^{m} \overline{Y}_j \frac{\partial Y_j}{\partial X_i} \ (i=1,\ldots,n),$$

i.e., FUNCTION_BAR provides the linear combination of the rows of the Jacobian of the function implemented by the procedure FUNCTION with weights given by the components of the vector $\overline{Y}$. The vectors $\overline{X}$ and $\overline{Y}$ are usually denoted as the adjoints of the vectors X and Y. Here we follow the common practice of denoting adjoints with a bar notation.

Vector Valued Functions

Embodiments of the method of the invention are applicable to vector valued payout functions. In this case, the computational cost associated with the calculation of the derivatives of the payout function scales with the dimension of its range, say R. Such computational cost can be reduced in some situations of practical relevance by embodiments of the invention configured to implement a hybrid Adjoint/Tangent approach.

A vector valued output function method is modeled as a composition of at least two steps (functions), for example $$(P_1, \ldots, P_R) = P(X,\theta) = F^{(e)}(F^{(i)}(X,\theta)),$$

with $(Y_1, \ldots, Y_J) = F^{(i)}(X,\theta)$, and $(P_1, \ldots, P_R) = F^{(e)}(Y)$, with $Y = (Y_1, \ldots, Y_J)$, and such that the dimension of the domain of $F^{(e)}$, J, is smaller than the dimension of its range, R.

Accordingly embodiments of the invention provide a computationally efficient apparatus for calculating derivatives of $P(X,\theta)$. One embodiment is configured to carry out the following steps: i) A rapid differentiator operates in a Tangent multi-mode of AD. In one embodiment of the invention the rapid differentiator is constructed by using a suitable AD tool, to provide the derivatives $\partial F_k^{(e)}(Y)/\partial Y_j$; ii) Set $\overline{Y}_k^j = \partial F_k^{(e)}(Y)/\partial Y_j$; iii) Evaluate $(\overline{X}, \overline{\theta}) = \overline{F}^{(i)}(\overline{Y})$, where $\overline{F}^{(i)}(\overline{Y})$ is the (multi-mode) adjoint of $F^{(i)}(X,\theta)$. This provides an apparatus with a computational complexity that scales linearly with J instead of R.

Adjoint Payout Unit 103

Returning now to FIG. 3 it is seen that vector value X is provided by sample generator 101 to an adjoint payout unit 103. A system output, or "payout", is in general a function of both the state vector X and some or all the model parameters θ P=P(X,θ). To determine sensitivity of a system output to changes in parameters influencing the system inputs adjoint payout unit 103 and adjoint sample generator 105 cooperate to provide $\partial V(\theta)/\partial \theta_i$. The system output (or payout) function explicitly depends on θ. In other words θ appears in the mathematical representation of the output function. Furthermore, the state vector X also implicitly depends on θ. Since the output function depends on state vector X, and state vector X depends on θ, the output function has an additional dependence on θ (implicit dependence).

Adjoint payout unit 103 calculates the value of the system output, or payout P. In one embodiment of the invention payout P represents the value of the cash flows prescribed by the contract for a given realization of the underlying factors, represented by the state vector X. The value for P for each scenario is provided to a memory unit 113 where it is stored.

For each random state vector X, provided by sample generator 101, adjoint payout unit 103 further provides a corresponding value for the adjoint state vector $\overline{X}$ at an adjoint payout unit 103 output. These represent the derivatives of the value of the payout P on a given scenario with respect to variations of the components of the state vector X, namely $\overline{X}_i = \partial P/\partial X_i$ (i=1, . . . , d). Further, for each collection of sampled values represented by vector X provided by sample generator 101, adjoint payout unit 103 provides a corresponding value for $\overline{\theta}^P$ at an adjoint payout unit output. This output represents the derivatives of the payout with respect to the model parameters. Thus $\overline{\theta}^P$ represents $\overline{\theta}_i^P = \partial P(X,\theta)/\partial \theta_i$ (i=1, . . . , n).

Adjoint payout unit 103 is configured to implement Adjoint Algorithmic Differentiation (AAD), for the calculation of the derivatives of the payout with respect to both the components of the state vector X, and to those of the parameter vector θ, on the given simulated scenario.

Adjoint payout unit 103 includes a first output, the payout P, coupled to an input of memory unit 113, a second output $\overline{X} = (\overline{X}_1, \ldots, \overline{X}_d)$ coupled to an input of an adjoint sample generator 105, and a third output $\overline{\theta}^P = (\overline{\theta}_1^P, \ldots, \overline{\theta}_n^P)$ coupled to a first input of adder 107.

Input

An input to adjoint payout unit 103 is a vector X=X[iscenario], provided by sample generator 101, and representing the state vector on the given scenario.

Outputs

The outputs of the adjoint payout unit 103 are the adjoint vectors $\overline{X}$[iscenario] and $\overline{\theta}^P$[iscenario], namely, the vectors with components $$\overline{X}_i = \frac{\partial P(X, \theta)}{\partial X_i} \quad i = 1, \ldots, d,$$

$$\overline{\theta}_i = \frac{\partial P(X, \theta)}{\partial \theta_i} \quad i = 1, \ldots, n,$$

calculated on the given scenario. As illustrated in FIG. 3 the values of the payout calculated by adjoint payout unit 103 are provided to a memory unit 113 where the values are stored. For simple payout functions, adjoint payout unit 103 is implementable by examination of the source code implementing the payout function and coding the adjoint of the source code to provide target code. The target code is then used to configure adjoint payout unit 103.

Figure 6:
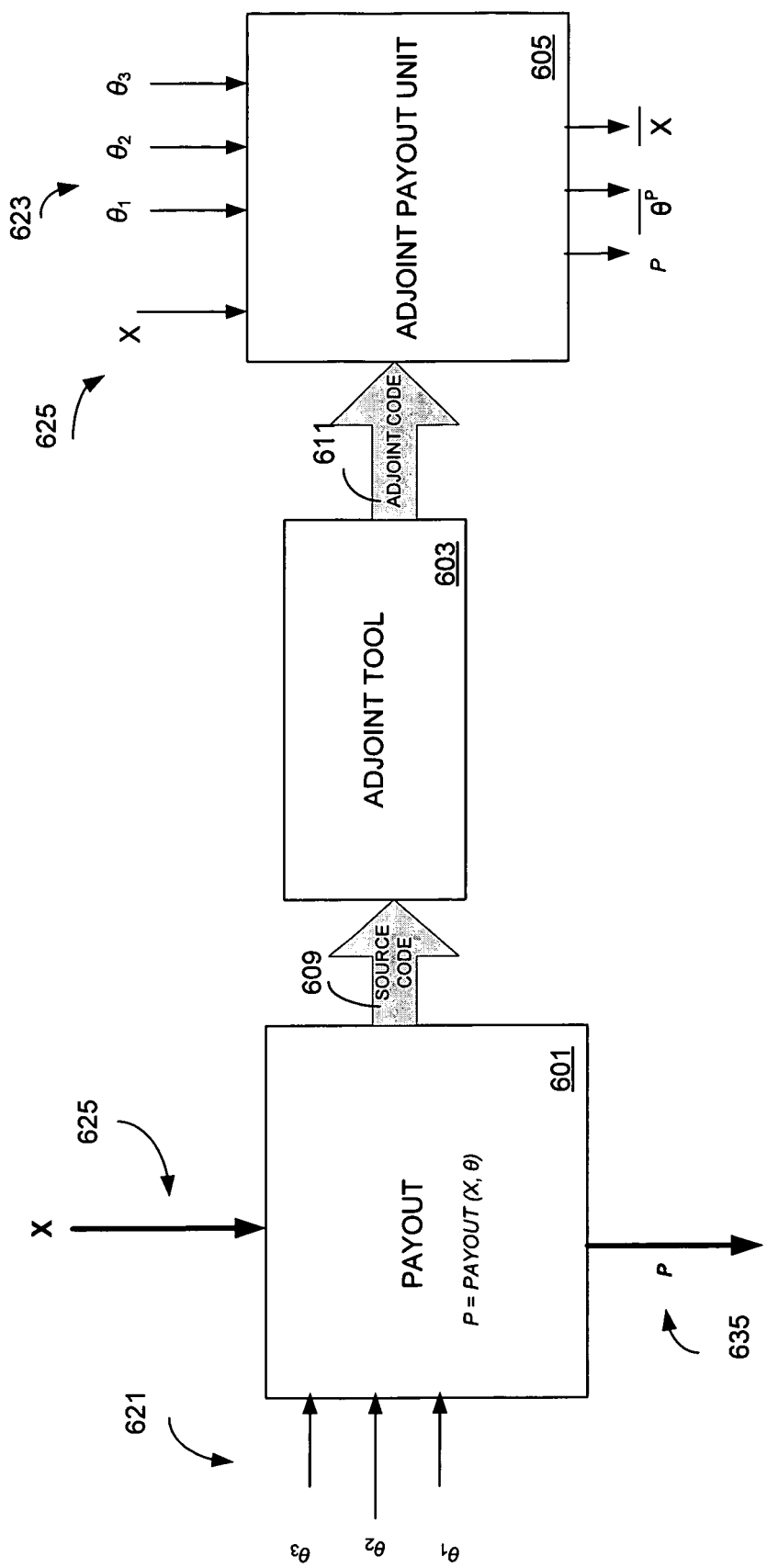
FIG. 6 is a block diagram illustrating an apparatus for configuring an adjoint payout unit according to an embodiment of the invention.

FIG. 6 Adjoint Payout Configuration

FIG. 6 is a block diagram illustrating an apparatus for configuring an adjoint payout unit according to an embodiment of the invention. Table I provides example pseudo-code for carrying out steps for calculating a payout function. Table II provides example adjoint code corresponding to the example pseudo code of Table I. In the examples of Table I and II a basket call option payout function is implemented, for example:

$$P(X, \theta) = Df \times \max\left(\sum_{j=1}^{d} \alpha_j X_j - K, 0\right).$$

In this example d is the number of assets in the Basket, $\alpha_j$ is a set of weights, K is the strike price, Df=exp(-rT) is the discount factor, r is instantaneous interest rate, and T is the maturity of the option. In this example, the latter two quantities are two of the quantities with respect to which sensitivities are calculated in this example. In that case $\theta_1 = r$ and $\theta_2 = T$.

According to the principles of AAD, the adjoint payout unit 103, for scalar payouts, can be implemented in such a way that the time needed for its execution (providing for each scenario both the value of the payout and all its derivatives) is bounded by a constant (of order 4) multiplied the time needed for the evaluation of the payout function alone.

Adjoint Tool 603

In one embodiment of the invention, adjoint payout unit 605 is configured offline using an adjoint tool 603. FIG. 6 illustrates an example adjoint payout unit 605 to be configured by providing the code for the payout function, PAYOUT (X,θ), to the adjoint tool 603. The latter produces the implementation of adjoint payout unit 605, as a code PAYOUT BAR ($\overline{P}$,X,θ). This evaluates both the payout function value and, when initialized with $\overline{P}$=1, the value of its derivatives $\overline{X}$ and $\overline{\theta}^P$.

Returning now to FIG. 3, it is noted that AAD tool 603 is a commercially available tool for generating adjoints.

Adjoint Tool Input

The input to adjoint tool 603 is the source code implementing payout function PAYOUT(X,θ). Table I provides a source code as a pseudo code listing of steps executed on a computer to calculate PAYOUT(X,θ).

TABLE I

```
function PAYOUT( X[ ], Theta[ ] ) {
    r = Theta[1]; // Instantaneous Interest Rate
    T = Theta[2]; // Maturity
    Df = exp(-r * T); // Discount Factor
    avg = 0.0;
    for (iass = 0; iass < N; iass++) // Calculates the Basket
        avg = avg + X[iass] * alpha [iass];
    x1 = avg - K;
    P = Df * max( x1, 0.0);
    return P;
}
```

Adjoint Tool Output

An output of adjoint tool 603 is a code listing that represents the adjoint of the payout function source code, for example, the code listing provided in Table I. The adjoint code is provided in Table II.

TABLE II

```
Function PAYOUT_BAR( P_bar, X[ ], Theta[ ] ){
    // forward sweep
    r = Theta[1]; // Instantaneous Interest Rate
    T = Theta[2]; // Maturity
    Df = exp(-r * T); // Discount Factor
    avg = 0.0;
    for (j = 0; j < d; j++) // Calculates the Basket
        avg = avg + X[j] * alpha [j];
    x1 = avg - K;
    P = Df * max( x1, 0.0);
    // backward sweep
    Df_bar = max(x1, 0.0) * P_bar;
    if( x1 < 0)
        x1_bar = 0.0;
    else
        x1_bar = Df * P_bar;
    avg_bar = x1_bar;
    for (j = 0; j < d; j++)
        X_bar[j] = avg_bar * alpha [j];
    T_bar = - Df * Df_bar * r;
    r_bar = - Df * Df_bar * T;
    Theta_bar[2] = T_bar;
    Theta_bar[1] = r_bar;
    return (P , X_bar[ ], Theta_bar[ ] )
}
```

Adjoint Sample Generator 105

Adjoint payout unit 103 provides the adjoint state vector $\overline{X}$ values to an adjoint sample generator 105. Adjoint sample generator 105 is configured to operate on $\overline{X}$ input values by means of adjoint algorithmic differentiation (AAD). Adjoint sample generator provides the adjoints corresponding to sample generator 101. In a generic embodiment of the invention, sample generator 101 implements a series of steps comprising a computer program for generating samples. Each step in the computer program represents an intermediate calculation carried out to generate a sample in accordance with a function described by a model. For commercially available sample generators these steps comprise the code representing sample generation.

The intermediate calculations can be expressed in terms of a set of auxiliary variables $w_i^k$, k=0, . . . , K, i=1, . . . , $L_k$, so that the k-th calculation of the composition can be described by the relation $$w^k = \text{FUNCTION}\_k(w^{k-1})$$

Such composition of calculations represents the relationship between the inputs to sample generator 101 ($\theta_1 = w_1^0, \ldots, \theta_n = w_n^0$), and the outputs ($X_1 = w_1^K, \ldots, X_d = w_d^K$) of sample generator 101. The relationship is defined by a selected model. Note that each of the calculations depends parametrically on random numbers provided by a random number generator 99 (here and below the dependence on the random numbers Z is omitted in the equations for simplicity of notations).

For each step of the program code implementing sample generator 101 representing a function $$w^k = \text{FUNCTION}\_k(w^{k-1})$$

Adjoint sample generator 105 contains the adjoint counterpart of the step as represented by the function $$\overline{w}^{k-1} = \text{FUNCTION}\_k\_\text{BAR}(\overline{w}^k, w^{k-1})$$

calculating the linear combination $$\overline{w}_i^{k-1} = \sum_{j=1}^{L_k} \overline{w}_j^k \frac{\partial w_j^k}{\partial w_i^{k-1}}.$$

k=0, . . . , K by means of the adjoint mode of algorithmic differentiation (AAD). As a result adjoint sample generator implements a series of steps comprising K+1 functions represented as a set of auxiliary adjoint variables $\overline{w}_i^k$, k=0, . . . , K, i=1, . . . , $L_k$. Each of the function FUNCTION_k_BAR above is implemented either directly using the principles of AAD or configured offline by means of available AD tools.

Optimal implementations of adjoint sample generator 105 are in general achieved by storing some of the information obtained while executing the code implementing sample generator 101.

According to embodiments of the invention adjoint sample generator unit 105 is implemented such that the time needed for its execution is bounded by a constant (of order 4) multiplied the time needed for the evaluation of sample generator unit 101.

The program steps implementing the adjoint sample generator 105 are executed in the opposite direction of the execution of program steps implementing the sample generator 101. In particular, the adjoint state vector $\overline{X}$ initializes the auxiliary adjoint variables at step K, ($\overline{w}_1^K = \overline{X}_1, \ldots, \overline{w}_d^K = \overline{X}_d$) and the auxiliary adjoint variables at step 0 are passed as the output of the adjoint sample generator ($\overline{\theta}^X = \overline{w}_1^0, \ldots, \overline{\theta}_n^X = \overline{w}_n^0$).

For each scenario, adjoint sample generator 105 is provided with the same set of random numbers used by the sample generator 101 by the random number generator 99. Adjoint sample generator 105 provides values for $\overline{\theta}^X$ at an adjoint sample generator 105 output. These are provided to second input of adder 107, and represent the derivative of the payout value on a given scenario with respect to the model parameters due to its implicit dependence on them through the state vector X, namely:

$$\overline{\theta}_i^X = \sum_{j=1}^{d} \frac{\partial P(X, \theta)}{\partial X_j} \frac{\partial X_j}{\partial \theta_i}.$$

Input

Adjoint sample generator 105 receives sample adjoints $\overline{X} = \overline{X}[\text{iscenario}]$ at an input 121.

Implementations of the adjoint sample generator 105 are model dependent and mirror the implementations for sample generator unit 101. Therefore adjoint sample generator 105 receives the information on the selected model from market model selector 97. The model parameters received by adjoint sample generator 105 are the same parameters received by sample generator 101 from parameter initializing unit 96. Also, for each scenario, the random numbers passed to adjoint sample generator 105 are the same of those passed to sample generator 101.

Output

Adjoint sample generator 105 provides the vector $\bar{\theta}^X = (\bar{\theta}_1^X, \ldots, \bar{\theta}_n^X)$ at an output. This vector represents the value of the derivatives $$\bar{\theta}_i^X = \sum_{j=1}^{d} \frac{\partial P(X, \theta)}{\partial X_j} \frac{\partial X_j}{\partial \theta_i}$$

with (i=1, ..., n), for each simulated scenario.

The output of adjoint sample generator 105 is coupled to a second input of adder 107.

Figure 7:
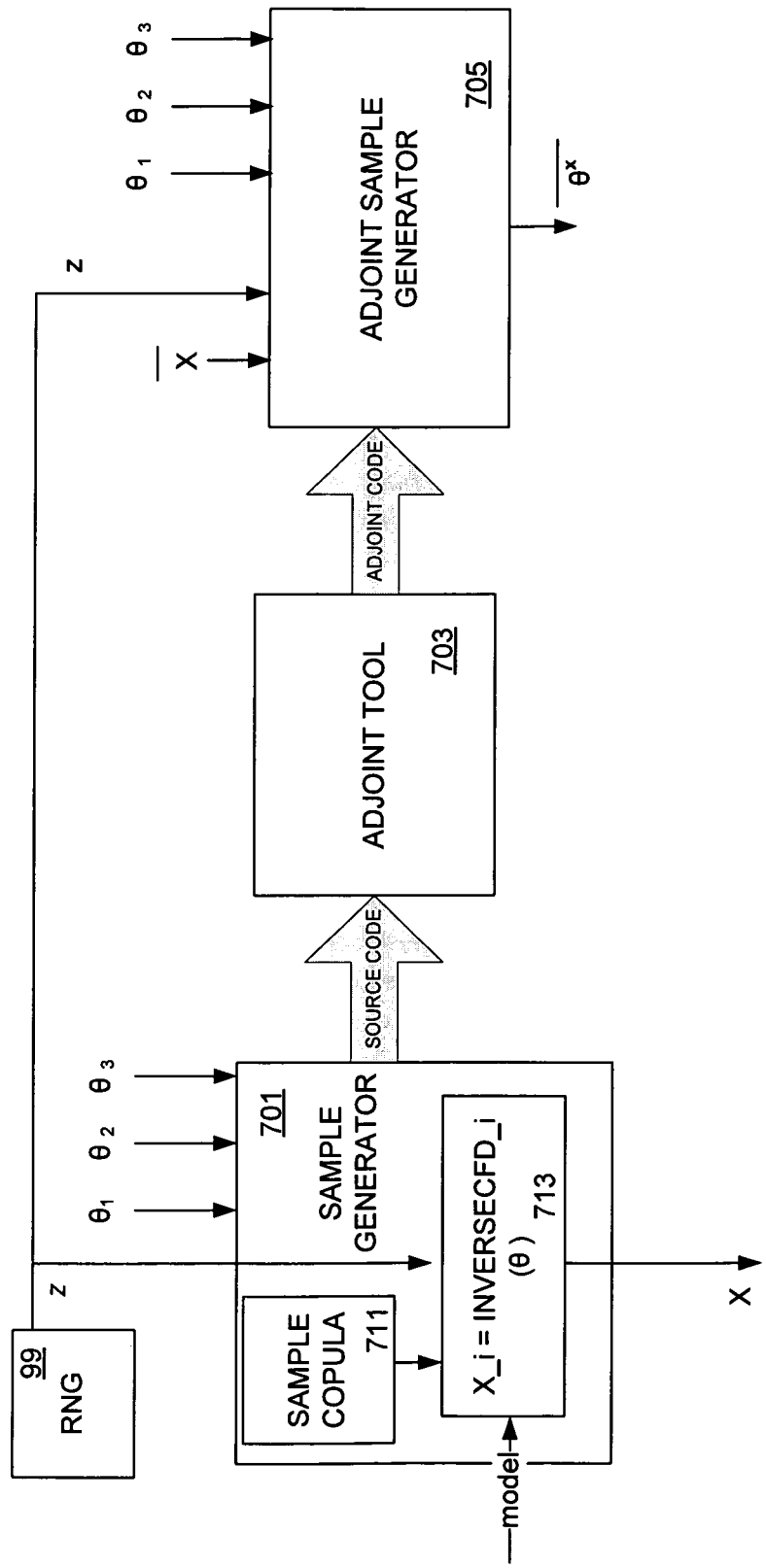
FIG. 7 is a block diagram illustrating an apparatus for configuring a sample adjoint unit according to an embodiment of the invention.

FIG. 7 Adjoint Sample Generator Configuration

FIG. 7 is a block diagram illustrating an apparatus for configuring a sample adjoint unit 705 according to an embodiment of the invention. In one embodiment of the invention adjoint sample generator 705 is configured to implement a composition of a set of intermediate functions representing the adjoint counterparts of the functions in the procedure implemented in the sample generator 101.

For instance, in one embodiment of the invention, the steps of the program implementing sample generator 101 sample the state vector X, according to a Gaussian Copula distribution, as previously discussed. For ease of discussion only calculation of sensitivities with respect to parameters entering in the definition of the marginal distributions are discussed herein. The generalization to sensitivities of the Copula function itself, e.g., involving the correlation structure, will be apparent to those of ordinary skill in the art upon reading this specification.

In this embodiment the adjoint sample generator can be implemented in terms of calls of the following n simple functions $$\bar{\theta}^X = \text{INVERSECDF}\_i\_\text{BAR}(\bar{X}_i, \theta),$$

each representing the adjoint of the method $$X_i = \text{INVERSECDF}\_i(\theta),$$

i.e, representing the adjoint of the method calculating the inverse CDF of each marginal distribution $M_i(x,\theta)$, as seen as a function of the parameters θ only (i.e., for a fixed value of the argument x which, in the example considered, does not carry any θ-dependence). More precisely, the function INVERSECDF_i_BAR provides the calculation of the quantities $$\bar{\theta}_j^X = \bar{X}_i \frac{\partial M_i^{-1}(H_i, \theta)}{\partial \theta_j}$$

for j=1, ..., n by means of AAD. The inputs of the functions INVERSECDF_i_BAR are the i-th component of the adjoint state vector $\bar{X}$, and the vector of model parameters θ. These constitute the inputs of the adjoint sample generator 105. Note that each of the functions above depends also parametrically on the random numbers Z, generated by the Random Number Generator RNG 99 through the variables $H_i$. For a given scenario, by summing the vectors obtained as output of the functions INVERSECDF_i_BAR the vector $\bar{\theta}^X = \bar{\theta}^X[\text{iscenario}]$ is provided. This vector is the output of adjoint sample generator 105.

In some embodiments of the invention the functions INVERSE_CDF_i are simple enough so that their adjoint counterparts can be coded according to the principles of algorithmic differentiation without the assistance of an adjoint tool. In other embodiments, the functions INVERSECDF_i_BAR are generated by AAD tools, similarly to the adjoint payout unit 103.

Alternative Embodiment of Adjoint Sample Generator

In one embodiment of the invention sample generator 101, for each scenario, is implemented in terms of a Markov Chain process. In this embodiment, adjoint sample generator 101 is implemented in terms of successive calls to the adjoint counterparts of the relations $$X(n+1) = F_n(X(n), \theta)$$

implementing the Markov chain. Each adjoint counterpart is of the form $$(\bar{X}(n), \bar{\theta}^X(n)) = \bar{F}_n(\bar{X}(n+1), X(n), \theta).$$

The order of execution of the adjoint functions above is the opposite with respect to the one of the functions propagating the state vector X, i.e., the input of the first function if the adjoint state vector $\bar{X}$, the state vector X, and the vectors of parameters θ. The output of the last adjoint function is the contribution to the adjoint parameters $\bar{\theta}^X$ given by the first time step of the propagation of the Markov chain. The sum of the vectors $\bar{\theta}^X$ for each of the time steps constitutes the output $\bar{\theta}^X = \bar{\theta}^X[\text{iscenario}]$, of adjoint sample generator 105.

In one embodiment of the invention, the adjoint sample generator is implemented by evaluating the derivatives $\partial X(\theta)/\partial \theta_i$, also known as tangent processes, on each scenario. In this process sample generator 101 is evaluated n times for perturbed input parameter values $\theta' = \theta + \Delta\theta \, e_i$ (with $e_i$ i-th vector of the standard basis of $R^n$), for i=1, ..., n and small $\Delta\theta$. The tangent process $\partial X(\theta)/\partial \theta_i$ can then be carried out by taking finite differences of the sampled state vector generated for the perturbed $\theta_i'$ and the original θ'.

Another embodiment of the invention is configured by modifying the sample generator 101, in order to sample the pair ($X_j(\theta' = \theta + \Delta\theta \, e_i)$, $X_j(\theta)$). This technique, known as path recycling, reuses as much information as possible Another embodiment of the invention is configured by modifying the sample generator 101 in order to evolve the stochastic differential equation (SDE) satisfied by $\partial X(\theta)/\partial \theta_i$. The SDEs can also be simulated by applying the Tangent mode of AD to the composition functions represented by steps of the program code implementing sample generator 101.

Adder 107

Adjoint payout unit 103 provides $\bar{\theta}^P$ values to a first input of an adder 107. Adder 107 is configured to operate on each scenario, on its first and second inputs, namely $\bar{\theta}^P = \bar{\theta}^P[\text{iscenario}]$, $\bar{\theta}^X = \bar{\theta}^X[\text{iscenario}]$ in accordance with the following:

$$\bar{\theta}_i[\text{iscenario}] = \bar{\theta}_i^P[\text{iscenario}] + \bar{\theta}_i^X[\text{iscenario}],$$

for (i=1, ..., n). This quantity represents the following pathwise derivative estimator on the given simulated scenario, namely $$\overline{\theta}_i = \frac{dP(X(\theta), \theta)}{d\theta_i} = \sum_{j=1}^{d} \frac{\partial P(X, \theta)}{\partial X_j} \frac{\partial X_j}{\partial \theta_i} + \frac{\partial P(X, \theta)}{\partial \theta_i}$$

(i=1, . . . , n).

Adder 105 combines the values it receives on first and second adder 105 inputs, and provides the result of the combination at an adder output. In one embodiment of the invention the combination operation is an addition operation. In that case addition of $\overline{\theta}^X$ and $\overline{\theta}^P$ yield $\overline{\theta}=(\overline{\theta}_1, \ldots, \overline{\theta}_n)$ at an output of Adder 105. These represent the derivative of the Payout value on a given scenario with respect to the model parameters $\theta=(\theta_1, \theta_2, \ldots, \theta_n)$, namely $\overline{\theta}_i = dP/d\theta_i$. The output of adder 105 is provided to a memory unit 113 where the output values are stored.

Adder 107 adds the values at its first and second inputs and provides an adder output comprising $\overline{\theta}=(\overline{\theta}_1, \ldots, \overline{\theta}_n)$. This output is provided to memory unit 113. Thus memory unit 113 stores the payout value, P, and the vector of its sensitivities with respect to $(\theta_1, \theta_2, \ldots, \theta_n)$, namely $(\overline{\theta}_1, \ldots, \overline{\theta}_n)$, with $\overline{\theta}_i = dP/d\theta_i$ (i=1, . . . , n), for each scenario simulated by Simulator 100.

Averaging Unit 111

An averaging unit 111 averages the payout and the values of the sensitivities $\overline{\theta}$ for each scenario stored in memory unit 113. In that manner, simulator 100 produces Monte Carlo estimates of the value of the option V, and its sensitivity to changes of the model parameters $\theta$, namely $\overline{\Theta}_i = dV/d\theta_i$ (i= 1, . . . , n). Standard confidence intervals are provided by averaging unit 111 based on the information stored for each scenario. In one embodiment of the invention averaging unit 111 averages scenario values stored in memory unit 113 and also forms appropriate confidence intervals.

In one embodiment of the invention the following quantities are provided on output:

$$V_{MC} = \frac{1}{N_{scenarios}} \sum_{iscenario=1}^{N_{scenarios}} P(X[iscenario], \theta)$$

$$\frac{\partial V}{\partial \theta_i} = \frac{1}{N_{scenarios}} \sum_{iscenario=1}^{N_{scenarios}} \overline{\theta}_i[iscenario]$$

(i=1, . . . , n) and providing, respectively, the Monte Carlo estimate of the value of the option, V, and of its sensitivities $\partial V/\partial \theta_i$.

In one embodiment of the invention the following quantities also are provided on output $$\sigma_V = \sqrt{\frac{1}{N_{scenarios}^2} \sum_{iscenario=1}^{N_{scenarios}} (P(X[iscenario], \theta) - V_{MC})^2}$$

$$\sigma_\theta^i = \sqrt{\frac{1}{N_{scenarios}^2} \sum_{iscenario=1}^{N_{scenarios}} \left(\overline{\theta}_i[iscenario] - \frac{\partial V_{MC}}{\partial \theta_i}\right)^2}$$

representing an estimate of the statistical uncertainties associated with the Monte Carlo calculation of the option price and its sensitivities in terms of the corresponding ~68% confidence intervals.

Figure 5:
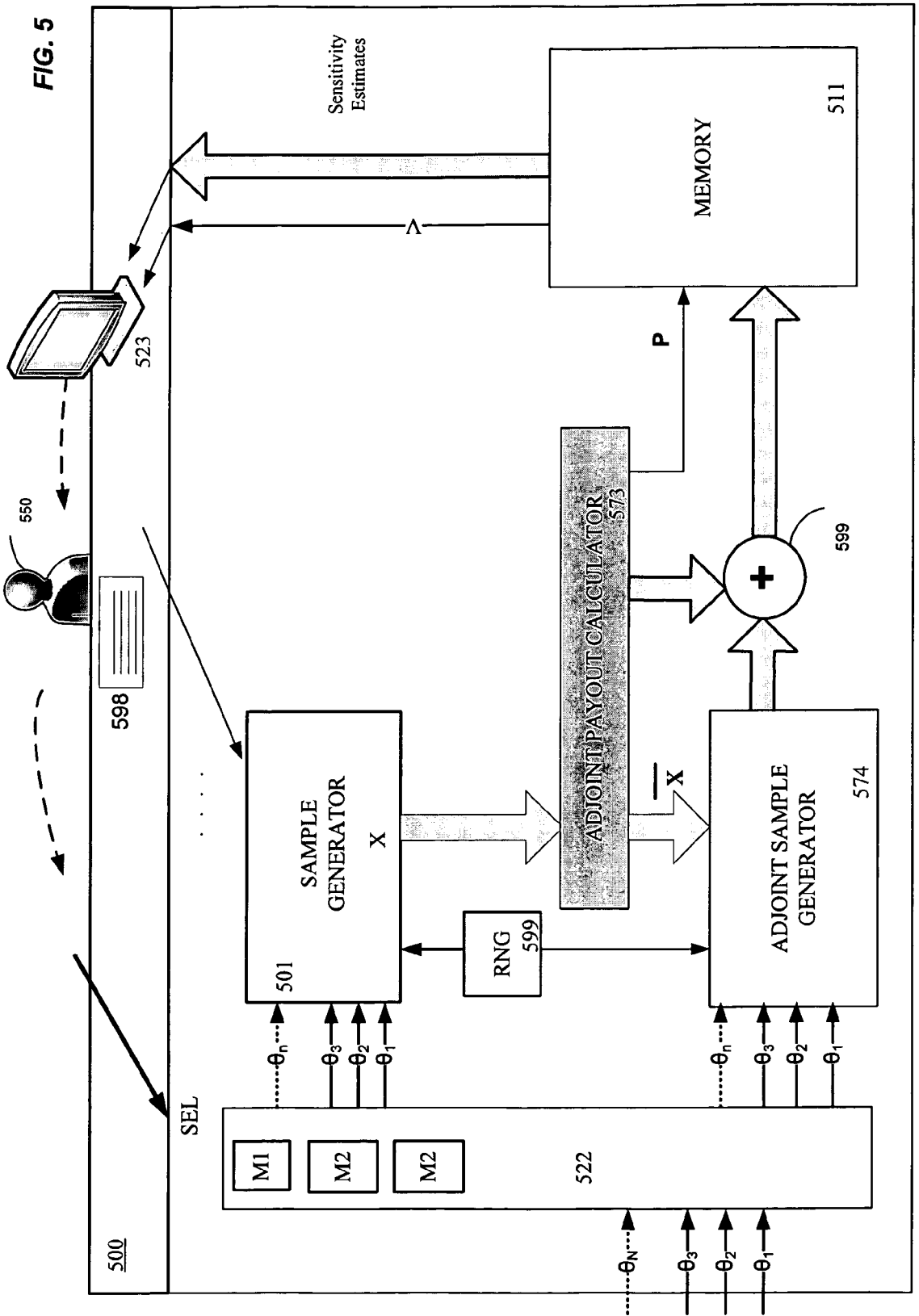
FIG. 5 is a block diagram illustrating a simulator according to an embodiment of the invention deployed.

FIG. 5 Example Deployment

FIG. 5 is a block diagram illustrating a simulator according to an embodiment of the invention deployed in a financial industry setting. When used in the financial industry, one embodiment of simulator 100 is intended for installation on a trading floor. Systems and methods of the invention provide information about the sensitivity of contract price to changes in values of underlying market factors. In the financial industry sensitivity is used as a risk indicator.

FIG. 5 illustrates an embodiment of a simulator 500 in use. A simulator operator 550, in this example, a trader, interacts with simulator 500 to simulate markets for the purpose of hedging derivatives securities, e.g., options. Simulator 500 enables operator 550 to efficiently and rapidly calculate price sensitivities when Monte Carlo (MC) or Quasi Monte Carlo (QMC) techniques are employed.

Indicators of price sensitivity include the "Greeks". Greeks are symbols used to denote sensitivity information in the financial industry. Each Greek represents a specific measure of risk in owning a contract. The Greeks are vital tools in risk management. If the Greeks can be determined with sufficient speed, cost and accuracy, portfolios of contracts can be adjusted in real time according to the Greeks and then ("hedged") in real time to achieve a desired level of risk. Hence, the risks associated with trading and owning options can be understood and managed using Simulator 100.

In one embodiment of the invention the results of a simulation are displayed to operator 550 via a display unit 523. Operator 550 uses the results provided by simulator 500 and displayed on display unit 523 to perform a hedge calculation. In one embodiment of the invention the output of simulator 500 is coupled to input to a device that automatically performs trades to hedge the risk connected with the security priced by the simulator 500.

In one embodiment of the invention operator 550 interacts with simulator 500 via keyboard 598 to select a model from model unit 522 to be used in a simulation. In some embodiments of the invention operator 550 provides initializing parameters to sample generator 501 at the commencement of a simulation.

As illustrated in FIG. 5 a simulator 500 comprises a sample generator 501 configured to receive simulator settings from a model selector 522 and a parameter selector SEL. A random number generator 599 provides random numbers to sample generator 501 and to adjoint sample generator 574. An adjoint payout unit 573 implements an adjoint payout function and is configured based on a contract payout function.

Adjoint payout unit 573 receives samples X from sample generator 501. Adjoint payout unit 573 provides the value of the payout, P, at first output. This value is provided to a memory unit 511. A second output $\overline{X}$ of adjoint payout unit 573 is provided to an adjoint sample generator 574. A third output $\overline{\theta}^P$, is provided to adder 599. Adjoint payout unit 573 provides first, second, and third outputs based on samples X received from sample generator 501.

Adjoint sample generator 574, receives an adjoint state vector, $\overline{X}$, from the adjoint payout unit 573 and provides the output $\overline{\theta}^X$ to adder 599. Adder 599 adds values received at its first and second inputs. The sum is provided at an output of Adder 599 to memory unit 511. Thus simulator 500 provides a value of an option, and its sensitivities with respect to the model parameters.

Figure 8:
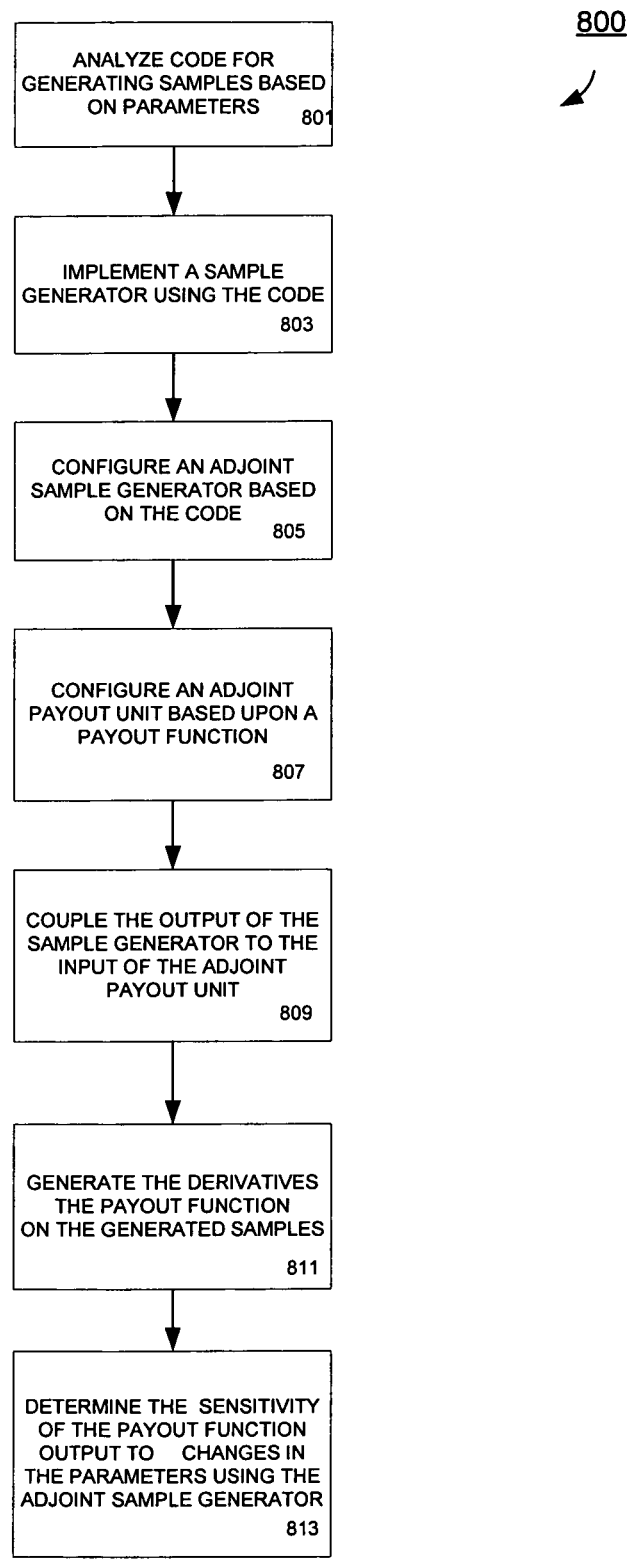
FIG. 8 is a flowchart illustrating steps of a method according to an embodiment of the invention.

FIG. 8 Sensitivity Method

FIG. 8 is a flowchart illustrating steps of a method for determining sensitivity of a system output to changes in factors influencing system inputs. According to one embodiment of the invention the steps illustrated in FIG. 8 implement a method for determining price sensitivity for a contract comprising components influenced by random market factors.

A method for calculating sensitivities of an option defined by a payout function according to one embodiment of the invention is carried out by the following steps. At step 801 computer code for generating samples based on parameters is analyzed. Computer code for generating samples is commercially available from a number of sources known to those of ordinary skill in the art. In one embodiment of the invention the analysis step is carried out by providing the code to an adjoint tool. In that case the adjoint tool analyzes the code. In other embodiments of the invention the examination is performed without the aid of an adjoint tool, for example by examination of code, source code, pseudo code or other computer program listings describing processor executed steps for generating samples. The code is examined to determine a sequence of code processing steps which carry out sample generation in a manner suitable for use with at least one of the various embodiments of the invention described herein.

At step 803 a sample generator (such as sample generator 101 illustrated in FIGS. 1 and 3) is implemented based on the computer code. In one embodiment of the invention the implementing step is carried out by standard methods of installing software on a computer. Once installed the software is configured to generate samples in accordance with provider's instructions.

At step 805 an adjoint sample generator is configured based on the computer code implementing the sample generator according to step 801. In one embodiment of the invention an adjoint sample generator is configured by the following steps. A set of adjoint functions is obtained by carrying out steps of adjoint algorithmic differentiation with respect to the sequence of coded processing steps examined in step 801. The set of adjoint functions is used to configure an adjoint sample generator in accordance with embodiments of the invention. In one example embodiment the set of adjoint functions is applied to configure the adjoint sample generator such that the adjoint sample generator carries out steps of pathwise differentiation with respect to inputs of the adjoint sample generator.

At step 807 an adjoint payout unit is configured based on a payout function. A system output, or "payout", is in general a function of both a state vector X provided by a sample generator such as sample generator 101, and some or all model parameters θ P=P(X,θ). To configure an adjoint payout unit according to one embodiment of the invention, the following steps are carried out. Steps of adjoint algorithmic differentiation are carried out with respect to a computer coded sequence of steps designed to cause a processor to calculate a payout function. The set of adjoint functions thus obtained is used to configure an adjoint payout unit. For example, the set of adjoint functions is transcribed to computer code for carrying out the adjoint functions. The code is stored in a memory or otherwise provided to a processor thereby implementing one embodiment of an adjoint payout unit. The unit is configured to cooperate with other elements of the simulator described herein to carry out a simulation.

At step 809 the output of the sample generator is coupled to the input of the adjoint payout unit. At step 811 the derivatives of the payout function are generated based on the generated samples. At step 813 the sensitivity of the payout function output to changes in the parameters is determined using the adjoint sample generator. For example the adjoint payout unit evaluates the sample generated by the sample generator thereby differentiating the payout with respect to parameters and components of the state vectors comprising the samples. Further differentiation of components of the state vectors provides sensitivity information.

According to embodiments of the invention the method 800 provides any number of sensitivity with a time of execution bounded by a constant (of order 4) multiplied the time needed for the evaluation of the payout value only. This is in contrast with conventional systems providing in general the same output with a time increasing proportionally with the number of sensitivities.

Figure 9:
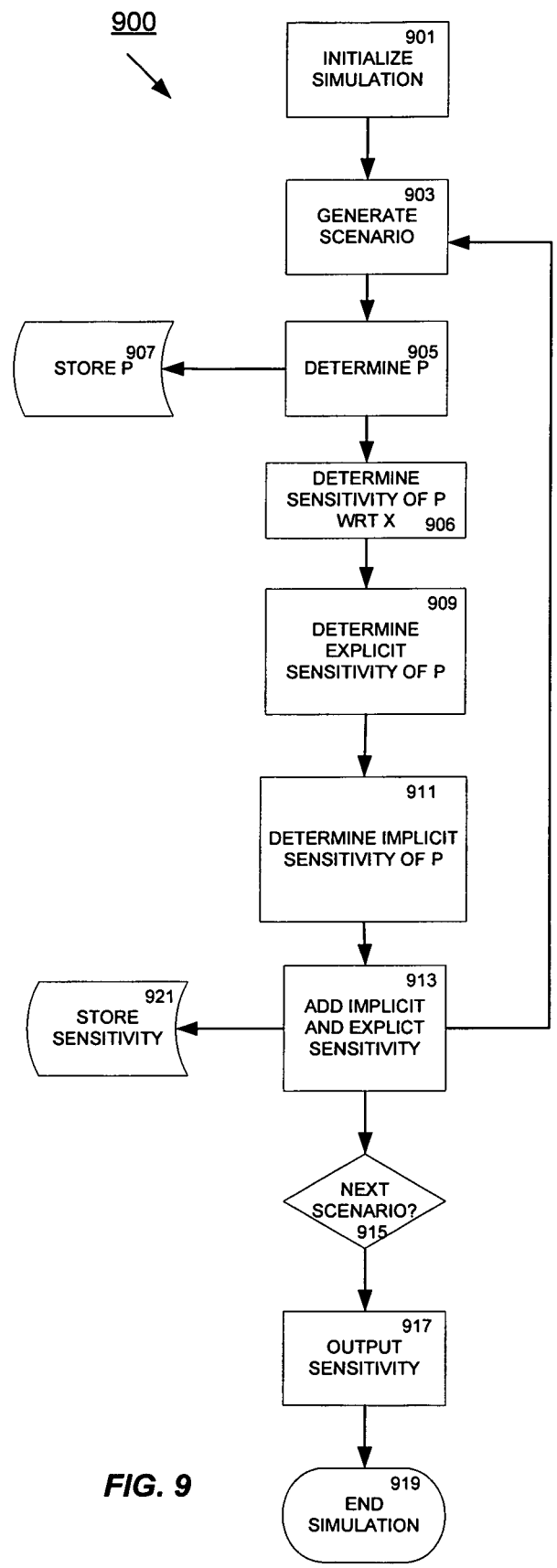
FIG. 9 is a flowchart illustrating more detailed steps of a method for estimating sensitivity of an output according to an embodiment of the invention.

FIG. 9 Method for Simulating

FIG. 9 is a flowchart illustrating a method for evaluating sensitivity of a system output V to changes in factors that influence system component values when the system output depends on the component values and the component values depend on component parameters and random factors. In a financial simulator embodiment of the invention a process output is given, for example, by a payout function defining a claim. In that case, sub process outputs comprise values of random sub processes depending on input parameters, upon which the claim output depends.

Regardless of industry in which simulator 100 is deployed, the sensitivity analysis method according to an embodiment of the invention comprises the following steps.

Step 901 Initialize Simulation

At step 901 the simulation is initialized. In one embodiment of the invention the initialization step is carried out by the following steps. A model is selected for each component of a system to be simulated. The specific model used in the simulation is operator selectable via a model selector. Each selected model defines a relationship of parameters and factors influencing components whose behavior or state is described by the model. For purposes of this specification the quantities $\theta=(\theta_1, \theta_2, \ldots, \theta_N)$ are used to represent the set of all possible parameters of models selectable for use in Simulator 100. A parameter subset $\theta=(\theta_1, \theta_2, \ldots, \theta_n)$, are selected and initialized. The selected parameter subset is used in a simulation. Simulation parameters represent factors which, once assigned values, remain constant throughout the simulation. On the other hand, random values are assigned to random factors via a random number generator.

Various embodiments of the invention will employ different models for different components. Likewise, each component can comprise the same model. In a financial industry example embodiment of the invention a model defines steps for sampling random state vectors comprising a contract.

Step 903 Generate Scenarios

At step 903 a scenario is generated. In one embodiment of the invention a scenario is generated by the following steps. Samples are generated in accordance with the vector X of d random state variables upon which an output depends, $X=(X_1, \ldots, X_d)$, thereby simulating a physical or financial system, or process. In some embodiments of the invention, d-dimensional vectors of state variables $X=(X_1, \ldots, X_d)$ are generated thereby implementing a series of relations that define the dependence of each sample of X on the values of the parameters θ, and the random numbers Z. Each vector X, obtained for a given set of random numbers Z, defines a scenario X=X[iscenario]. In one embodiment of the invention a generated scenario comprises a random state vector $X=(X_1, \ldots, X_d)$.

In a financial industry embodiment the vector X may represent the value of a collection of market factors (e.g., stock prices, interest rates, etc.) on a set of dates specified by a contract under valuation. In the first case for instance, d is typically the number of underlying factors times the number of observation dates.

Several commercially available software packages exist for carrying out the generating step. Other suitable software packages will be known to those of ordinary skill in the art Step 905 Determine P In step 905 a payout P is determined. A payout is in general a function of both the state vector X and some or all the model parameters θ, P=P(X,θ). A payout function P(X,θ) determines payout P. In one embodiment of the invention the payout function is provided by a simulator operator. In a financial industry example embodiment a payout function comprises a relationship that is expressed, for example, as:

$$V(\theta)=E_Q[P(X,\theta)]$$

wherein X represents a vector of d random state variables $X=(X_1, \ldots, X_d)$ upon which the payout P depends. The output of the function is the value of the payout for the realization of a random sample X.

P is determined in step 905 by an adjoint payout unit. The adjoint payout unit calculates the value of the payout P, for example, representing the value of the cash flows prescribed by the contract for a given realization of the underlying factors, represented by the state vector X. At step 907 the value for P for each scenario is provided to a memory unit for storage.

Step 906 Determine Sensitivity of P with Respect to X

At step 906 an adjoint state vector is determined. For each collection of sampled values represented by vector X generated in step 903, corresponding values for $\bar{X}$ are provided. The corresponding values represent the derivatives of the payout with respect to the components of the state vector X. Thus $\bar{X}$ represents:

$$\bar{X}_i = \partial P(X,\theta)/\partial X_i \ (i=1, \ldots, d).$$

According to embodiments of the invention the step of determining the Adjoint state vector is carried out by adjoint algorithmic differentiation (AAD) steps.

Step 909 Determine Explicit Sensitivity

At step 909, explicit sensitivity is determined. For each collection of sampled values represented by vector X generated in step 903, corresponding values for $\bar{\theta}^P$ are provided. These corresponding values represent the derivatives of the payout with respect to the model parameters. Thus $\bar{\theta}^P$ represents:

$$\bar{\theta}_i^P = \partial P(X,\theta)/\partial \theta_i \ (i=1, \ldots, n).$$

According to embodiments of the invention the step of determining explicit sensitivities is carried out by adjoint algorithmic differentiation (AAD) steps.

Step 911 Determine Implicit Sensitivity

At step 911, implicit sensitivity is determined. In one embodiment of the invention implicit sensitivity of a value of output P is given, for example of the payout of a contract. For each generated adjoint random state vector $\bar{X}$ generated in step 906, corresponding values for $\bar{\theta}^X$ are provided. These vectors represent the derivatives of the payout with respect to the model parameters due to the dependence of state vector X on the model parameters. Thus $\bar{X}$ represents:

$$\bar{\theta}_i^X = \sum_{j=1}^{d} \frac{\partial P(X,\theta)}{\partial X_j} \frac{\partial X_j}{\partial \theta_i} \ (i=1, \ldots, n).$$

According to embodiments of the invention the step of determining the implicit sensitivities is carried out by adjoint algorithmic differentiation (AAD) steps.

Step 913 Add Sensitivities

At step 913 the explicit sensitivity and the implicit sensitivity are added. For each scenario generated in step 903, the explicit $\bar{\theta}^P = \bar{\theta}^P[\text{iscenario}]$ and implicit $\bar{\theta}^X = \bar{\theta}^X[\text{iscenario}]$ sensitivities are added as follows:

$$\bar{\theta}_i[\text{iscenario}] = \bar{\theta}_i^P[\text{iscenario}] + \bar{\theta}_i^X[\text{iscenario}],$$

for (i=1, ..., n). This result of the addition step provides an estimate of the derivation of P on the given simulated scenario, namely $$\bar{\theta}_i = \frac{dP(X(\theta)\theta)}{d\theta_i} = \sum_{j=1}^{d} \frac{\partial P(X,\theta)}{\partial X_j} \frac{\partial X_j}{\partial \theta_i} + \frac{\partial P(X,\theta)}{\partial \theta_i}$$

At step 921 the sum is stored in a memory.

Step 915 Generate Next Scenario

At step 915 a determination is made whether to generate another scenario. The determination is made based on the desired accuracy of the sensitivities. If another scenario is to be generated the method resumes at step 903 by generating another scenario. If another scenario will not be generated the method resumes at step 917 at the end of the loop on the number of scenarios.

Step 917 Provide Sensitivity Estimates

At step 917 sensitivity estimates are provided. In one embodiment, the step 917 is carried out by steps of averaging the sensitivity values stored in memory for each scenario as described by:

$$\frac{\partial V}{\partial \theta_i} = \frac{1}{N_{scenarios}} \sum_{iscenarios=1}^{N_{scenarios}} \bar{\theta}_i[iscenario]$$

An optional step of forming confidence intervals is carried out in some embodiments of the invention. According to one embodiment of the invention statistical uncertainties associated with a Monte Carlo calculation of output V and its sensitivities are determined in terms of the corresponding ~68% confidence intervals as described by:

$$\sigma_V = \sqrt{\frac{1}{N_{scenarios}^2} \sum_{iscenario=1}^{N_{scenarios}} (P(X[iscenario],\theta) - V_{MC})^2}$$

$$\sigma_\theta^i = \sqrt{\frac{1}{N_{scenarios}^2} \sum_{iscenario=1}^{N_{scenarios}} \left(\bar{\theta}_i[iscenario] - \frac{\partial V_{MC}}{\partial \theta_i}\right)^2}$$

In one embodiment of the invention the sensitivity and confidence interval information is provided to a display device, a second system or to a system operator.

Figure 10:
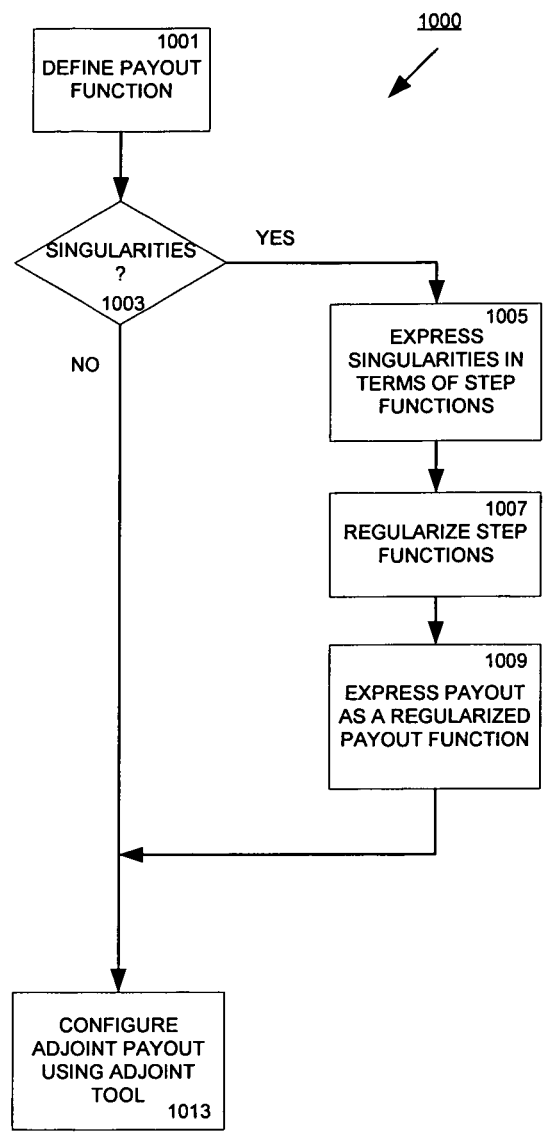
FIG. 10 is a flowchart illustrating steps of a method for configuring an adjoint payout unit when the payout function is characterized by singularities according to an embodiment of the invention.

FIG. 10 Method for Regularizing Payout Function

The payout functions of options based on the outcome of discrete random variables can be expressed in general in terms of combinations of elementary building blocks comprising a step function. The derivative of the step function, the so-called Dirac's delta, is singular. Therefore the derivative is regularized to implement a pathwise derivative method according to embodiments of the invention. In one embodiment of the invention a regularizing step is included comprising approximations of step and other singular functions with continuous and regular functions.

Another approach is to use a piece-wise linear function. In a financial embodiment this approach corresponds to an over-hedge of a digital payout with a call spread option. An alternative approach is to approximate the step function as a cumulative density function of a Gaussian distribution with zero mean and standard deviation σ. This corresponds to regularizing the Dirac's delta with a Gaussian of finite width σ.

FIG. 10 is a flowchart illustrating steps of a method for configuring an adjoint payout unit to operate in an embodiment of the invention wherein discontinuous payout functions appear. For example, digital and barrier options and claims depending on discrete random variables are known to present discontinuities. In particular singularities commonly arise when the payout function is implemented in a computer script comprising certain Heaviside or Step functions.

FIG. 10 illustrates an embodiment of the invention configured for determining discontinuous payouts. A method according to the embodiment illustrated in FIG. 10 comprises the following steps. At step 1001 a payout function is defined. At step 1003 a determination is made whether the payout function is discontinuous. If the payout function is discontinuous a step 1005 of expressing the singularities of the payout function by means of appropriate functions is carried out. In one embodiment of the invention the singularities are expressed in terms of step functions.

At step 1007 the step function is regularized. For purposes of this specification the term "regularized" refers to approximating step functions with non singular functions. At step 1009 the payout function is expressed as a regularized payout function. In one embodiment of the invention this step is carried out by replacing the implementation of the payout function with one of its regularized counterparts (call spread, cumulative normal, etc.).

At step 1013 an adjoint payout unit is configured based upon the regularized payout function. In one embodiment of the invention this step is carried out by application of an adjoint tool to the regularized payout function.

The method described above is applicable also to payouts of American and Bermudan style options. In these options the exercise condition is optimized with a regression algorithm, e.g., the Longstaff-Schwartz. This effectively implements a continuously or discretely monitored barrier. Early exercise conditions can be implemented by a step of reweighting the payouts with the product of smoothed exercise indicators. Thus, the payout function is regularized. This technique has the same effect as regularizing the adjoint payout by means of products of Gaussian distributions with finite width, or similar functions.

Although an embodiment of the invention is described above as being applied in the finance industry, embodiments of the invention may be employed in a broad variety of applications. Some possible areas and industries for application include, without limitation, oil industry analysis, and various types of networks including computer networks, transportation, circuit simulation, project scheduling, and decision analysis.

What is claimed is:

1. A simulating machine for simulating a stochastic system characterized by a system output defined by a set of system components influenced by a set of system parameters (θ) defining a system model, the simulating machine comprising:
   a processor;
   a memory coupled to said processor;
   a sample generator, coupled to said processor and said memory, configured to provide samples of said set of system components influenced by said set of system parameters (θ); and a differentiator coupled to said sample generator, said differentiator configured to operate on said samples in accordance with adjoint algorithm differentiation to provide a first sensitivity (dP/dθ) of said system output (P) with respect to at least one of said set of system parameters (θ) for each of a plurality of scenarios under simulation, and a second sensitivity (dV/dθ) of an expected value (V) of the system output with respect to at least one of said system parameters across the plurality of scenarios under simulation, wherein the second sensitivity and the expected value are based on the following formulation:

$$V_{MC} = \frac{1}{N_{scenarios}} \sum_{iscenario=1}^{N_{scenarios}} P(X[iscenario], \theta)$$

$$\frac{\partial V}{\partial \theta_i} = \frac{1}{N_{scenarios}} \sum_{iscenario=1}^{N_{scenarios}} \overline{\theta}_i[iscenario].$$

2. The simulating machine of claim 1, wherein said differentiator comprises:
   an adjoint output unit coupled to said sample generator, said adjoint output unit configured to receive said samples and operate on said samples in accordance with adjoint algorithmic differentiation to provide first sensitivity indicators of said system output with respect to said samples and second sensitivity indicators of said system output with respect to at least one of said set of system parameters; and
   an adjoint sample generator coupled to said adjoint output unit, the adjoint sample generator configured to receive said first sensitivity indicators and operate on said first sensitivity indicators in accordance with adjoint algorithmic differentiation to provide third sensitivity indicators of said system output with respect to said at least one of said set of system parameters.

3. The simulating machine of claim 2, wherein said differnetiatorfurther comprises:
   an adder coupled to said adjoint output unit to receive said second sensitivity indicators, and coupled to said adjoint sample generator to receive said third sensitivity indicators;
   said adder being configured to provide the first sensitivity (dP/dθ) of said system output with respect to at least one of said set of system parameters based at least on said second sensitivity indicators and said third sensitivity indicators.

4. The system of claim 1, wherein said system comprises a financial market, said expected value (V) of the system output comprises a contract price, said set of system components comprises a value of a set of market factors, and said second sensitivity (dV/dθ) comprises one or more "Greeks".

5. A method for simulating a stochastic system and for providing a first sensitivity (dP/dθ) of a system output (P)

defined by a set of components influenced by a respect to set of system parameters (θ), the method comprising: generating, via a processor, samples (X) of said set of system components; and via said processor, operating on said samples (X) in accordance with adjoint algorithmic differentiation to provide the first sensitivity (dP/dθ) of said system output with respect to at least one of said set of system parameters for each of a plurality of scenarios under simulation, and a second sensitivity (dV/dθ) of an expected value (V) of the system output with respect to at least one of said system parameters across the plurality of scenarios under simulation, wherein the second sensitivity and the expected value are based on the following formulation:

$$V_{MC} = \frac{1}{N_{scenarios}} \sum_{iscenario=1}^{N_{scenarios}} P(X[iscenario], \theta)$$

$$\frac{\partial V}{\partial \theta_i} = \frac{1}{N_{scenarios}} \sum_{iscenario=1}^{N_{scenarios}} \overline{\theta}_i[iscenario].$$

6. A method for simulating a stochastic system and for providing a sensitivity (dV/dθ) of an expected value (V) of a system output (P) defined by a set of components influenced by a set of system parameters (θ), the method comprising:

generating, via a processor, samples (X) of said set of system components influenced by said set of system parameters (θ); and via said processor, operating on said samples (X) in accordance with adjoint algorithmic differentiation to provide the sensitivity (dV/dθ) of said expected value (V) of the system output (P) with respect to at least one of said set of system parameters (θ) for each of a plurality of scenarios under simulation, and a second sensitivity of the expected value of the system output with respect to at least one of said system parameters across the plurality of scenarios under simulation, wherein the second sensitivity and the expected value are based on the following formulation:

$$V_{MC} = \frac{1}{N_{scenarios}} \sum_{iscenario=1}^{N_{scenarios}} P(X[iscenario], \theta)$$

$$\frac{\partial V}{\partial \theta_i} = \frac{1}{N_{scenarios}} \sum_{iscenario=1}^{N_{scenarios}} \overline{\theta}_i[iscenario].$$

* * * * *

UNITED STATES PATENT AND TRADEMARK OFFICE
CERTIFICATE OF CORRECTION

PATENT NO. : 9,058,449 B2  
APPLICATION NO. : 12/602452  
DATED : June 16, 2015  
INVENTOR(S) : Luca Capriotti Page 1 of 1

It is certified that error appears in the above-identified patent and that said Letters Patent is hereby corrected as shown below:

In the Claims;

Column 24, line 3 (claim 1), change "a system output defined by" to --a system output (P) defined by--
Column 24, line 9 (claim 1), change "provide samples of" to --provide samples (X) of--
Column 24, line 13 (claim 1), change "adjoint algorithm" to --adjoint algorithmic--

Column 25, line 1 (claim 5), change "influenced by a respect to set" to --influenced by a set--
Column 25, line 2 (claim 5), change "system parameters (O)" to --system parameters (è)--
Column 25, line 5 (claim 5), delete "(X)"

Column 26, lines 8 - 11 (claim 6), delete "for each of a plurality of scenarios under simulation, and a second     sensitivity of the expected value of the system output with respect to at least one of said system parameters"
Column 26, line 11 (claim 6), change "the plurality" to --a plurality--
Column 26, line 12 (claim 6), delete "second"

Signed and Sealed this  
Twenty-fourth Day of November, 2015

Michelle K. Lee  
*Director of the United States Patent and Trademark Office*